(12) United States Patent
Montero et al.

(10) Patent No.: US 8,909,542 B2
(45) Date of Patent: Dec. 9, 2014

(54) SYSTEMS AND METHODS FOR MANAGING BRAND LOYALTY

(75) Inventors: Michael Montero, Brooklyn, NY (US);
Irving Fain, New York, NY (US);
Joshua Bowen, New York, NY (US);
Joshua Laurito, New York, NY (US)

(73) Assignee: Crowdtwist, Inc., New York, NY (US)

( * ) Notice: Subject to any disclaimer, the term of this patent is extended or adjusted under 35 U.S.C. 154(b) by 330 days.

(21) Appl. No.: 13/470,058

(22) Filed: May 11, 2012

(65) Prior Publication Data
US 2012/0290370 A1 Nov. 15, 2012

Related U.S. Application Data

(60) Provisional application No. 61/485,914, filed on May 13, 2011.

(51) Int. Cl.
*G06Q 30/00* (2012.01)
*G06Q 30/02* (2012.01)

(52) U.S. Cl.
CPC .................................. *G06Q 30/0203* (2013.01)
USPC .................. 705/14.21; 705/14.17; 705/14.25; 705/14.53; 705/14.73; 705/7.11; 709/204; 709/206

(58) Field of Classification Search
None
See application file for complete search history.

(56) References Cited

U.S. PATENT DOCUMENTS

| | | | |
|---|---|---|---|
| 8,381,969 B1* | 2/2013 | Miller et al. .................. 235/379 |
| 2005/0004838 A1* | 1/2005 | Perkowski et al. ............. 705/14 |
| 2006/0247970 A1* | 11/2006 | Sattelmaier ..................... 705/14 |
| 2010/0145769 A1* | 6/2010 | Hamilton et al. ................ 705/10 |
| 2011/0082732 A1* | 4/2011 | Sattelmaier ................. 705/14.17 |
| 2011/0145064 A1* | 6/2011 | Anderson et al. .......... 705/14.53 |
| 2011/0191417 A1* | 8/2011 | Rathod .......................... 709/204 |
| 2011/0288906 A1* | 11/2011 | Thomas et al. .............. 705/7.29 |
| 2012/0185544 A1* | 7/2012 | Chang et al. .................. 709/206 |
| 2012/0209786 A1* | 8/2012 | Shah et al. ..................... 705/319 |
| 2012/0232976 A1* | 9/2012 | Calman et al. ............. 705/14.25 |
| 2012/0233258 A1* | 9/2012 | Vijayaraghavan et al. ... 709/204 |

OTHER PUBLICATIONS

Montgomery, Kathryn C., and Jeff Chester. "Interactive food and beverage marketing: targeting adolescents in the digital age." Journal of Adolescent Health 45.3 (2009): S18-S29.*

Haven, Brian, and Suresh Vittal. "Measuring engagement." Marketing (2008).*

Baran, R. "Social Networking in China and the United States: Opportunities for New Marketing Strategy and Customer Relationship Management." AFBE Journal (2011): 464.*

Mosadegh, Mohammad Javad, and Mehdi Behboudi. "Using social network paradigm for developing a conceptual framework in CRM." Australian Journal of Business and Management Research 1.4 (2011): 63-71.*

(Continued)

*Primary Examiner* — Gurkanwaljit Singh
(74) *Attorney, Agent, or Firm* — Lando & Anastasi, LLP

(57) ABSTRACT

A system for tracking brand interactions is provided. The system includes a memory and at least one processor coupled to the memory. The at least one processor is configured to receive information defining a plurality of brand interactions, receive a first indication of a first interaction defined within the plurality of brand interactions from a first source system, receive a second indication of a second interaction defined within the plurality of brand interactions from a second source system different from the first source system, and record an association between the brand, the first interaction, the second interaction and the brand enthusiast.

20 Claims, 33 Drawing Sheets

(56) References Cited

OTHER PUBLICATIONS

Etlinger, Susan, and C. Li. "A Framework for Social Analytics." Altimeter Group. USA. Published on 10 (2011): 2011.*

Bolotaeva, Victoria, and Teuta Cata. "Marketing opportunities with social networks." Journal of Internet Social Networking and Virtual Communities 2010 (2010): 1-8.*

* cited by examiner

FIG. 23   © 2011 CrowdTwist, Inc.

SYSTEMS AND METHODS FOR MANAGING BRAND LOYALTY

RELATED APPLICATIONS

This application claims priority under 35 U.S.C. §119(e) to U.S. Provisional Application Ser. No. 61/485,914, entitled "SYSTEMS AND METHODS FOR MANAGING BRAND LOYALTY," filed on May 13, 2011, which is hereby incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technical Field

The technical field relates generally to brand management and, more particularly, to managing brand loyalty using a distributed computer system.

2. Background Discussion

Conventional brand marketing and loyalty programs focus on building goodwill associated with a brand. There are many well-known examples of such programs. For instance, some petroleum companies offer fleet programs through which members receive a discount on fuel purchased from companies honoring the fleet card. Many food service companies offer programs that provide free or reduced-price meals to customers who purchase several full-price meals. Airline companies award frequent-flyer miles to travelers and these frequent-flyer miles may be exchanged for reduced-price or free flights, subject to blackout periods.

Conventional brand marketing and loyalty systems are architected with these examples in mind. Thus these systems employ a structure built around the brand-owner and, in some cases, companies affiliated with the brand owner.

SUMMARY

Examples and embodiments disclosed herein manifest and understanding that, because of their design and function, conventional brand marketing and loyalty systems present a fragmented view of brand enthusiast interactions with the brand. This incomplete picture of brand enthusiast interactions with the brand causes communications from brand managers to brand enthusiasts to lack personalization and relevance.

According to some aspects and embodiments disclosed herein, a method is provided for tracking brand interactions using a computer system. The method includes acts of receiving, by the computer system, information defining a plurality of brand interactions; receiving a first indication of a first interaction defined within the plurality of brand interactions from a first source system; receiving a second indication of a second interaction defined within the plurality of brand interactions from a second source system different from the first source system; and recording an association between the brand, the first interaction, the second interaction and the brand enthusiast. The information defining the plurality of brand interactions associates each respective brand interaction of the plurality of brand interactions with a corresponding process executed by at least one discrete source system different from the computer system. The first indication associates a brand enthusiast with the first interaction, and the second indication associates the brand enthusiast with the second interaction.

In the method, the act of receiving the first indication may include an act of receiving the first indication from at least one of FACEBOOK, TWITTER, MYSPACE, FOURSQUARE, GMAIL, YAHOO! Mail, HOTMAIL and AOL Mail. The method may further include acts of recording a first reward in response to receiving the first indication and recording a second reward in response to receiving the second indication. The act of recording the first reward may include acts of determining a reward factor, determining a first amount of virtual currency, and calculating the first reward using the reward factor and the first amount of virtual currency.

The method may further include acts of receiving a request to adjust the reward factor, receiving a third indication of a third interaction defined within the plurality of brand interactions from the first source system, and recording a third reward in response to receiving the third indication. The third indication may associate the brand enthusiast with the third interaction. The act of recording the third reward may include acts of determining an adjusted reward factor, determining a second amount of virtual currency, and calculating the third reward using the adjusted reward factor and the second amount of virtual currency.

The method may further include an act of determining a summary characterizing the number of brand interactions conducted by the brand enthusiast. The act of determining the summary may include an act of determining an impact score for the brand enthusiast. The act of determining the summary may include an act of determining a social influence score for the brand enthusiast. The method may also include an act of reporting the summary.

According to another embodiment, a system for tracking brand interactions is provided. The system includes a memory and at least one processor coupled to the memory. The at least processor is configured to receive information defining a plurality of brand interactions, receive a first indication of a first interaction defined within the plurality of brand interactions from a first source system, receive a second indication of a second interaction defined within the plurality of brand interactions from a second source system different from the first source system, and record an association between the brand, the first interaction, the second interaction and the brand enthusiast. The information defining the plurality of brand interactions includes indications of associations between each respective brand interaction of the plurality of brand interactions and a corresponding process executed by at least one discrete source system different from the computer system. The first indication includes an identifier of a brand enthusiast associated with the first interaction, and the second indication includes an identifier of the brand enthusiast.

The at least one discrete source system may include at least one of FACEBOOK, TWITTER, MYSPACE, FOURSQUARE, GMAIL, YAHOO! Mail, HOTMAIL and AOL Mail. The at least one processor may be further configured to record a first reward in response to receiving the first indication and record a second reward in response to receiving the second indication. The at least one processor may be further configured to determine a reward factor, determine a first amount of virtual currency, and calculate the first reward using the reward factor and the first amount of virtual currency.

The at least one processor may be further configured to receive a request to adjust the reward factor, receive a third indication of a third interaction defined within the plurality of brand interactions from the first source system, and record a third reward in response to receiving the third indication. The third indication may include an identifier of the brand enthusiast. The at least on processor may be configured to record the third reward by being configured to determine an adjusted reward factor, determine a second amount of virtual currency, and calculate the third reward using the adjusted reward factor and the second amount of virtual currency.

The at least one processor may be further configured to determine a summary characterizing the number of brand interactions conducted by the brand enthusiast. The summary may include an impact score for the brand enthusiast. The summary may include a social influence score for the brand enthusiast. The summary may include a gaming score for the brand enthusiast. The at least one processor may be further configured to report the summary.

According to another embodiment, a non-transitory computer readable medium storing instructions for tracking brand interactions is provided. The instructions are encoded to instruct at least one processor to receive information defining a plurality of brand interactions, receive a first indication of a first interaction defined within the plurality of brand interactions from a first source system, receive a second indication of a second interaction defined within the plurality of brand interactions from a second source system different from the first source system, and record an association between the brand, the first interaction, the second interaction and the brand enthusiast. The information defining the plurality of brand interactions includes indications of associations between each respective brand interaction of the plurality of brand interactions and a corresponding process executed by at least one discrete source system different from the computer system. The first indication includes an identifier of a brand enthusiast associated with the first interaction, and the second indication including an identifier of the brand enthusiast. The instructions may further instruct the at least one processor to receive the first indication from at least one of FACEBOOK, TWITTER, MYSPACE, FOURSQUARE, GMAIL, YAHOO! Mail, HOTMAIL, and AOL Mail.

Thus aspects and embodiments disclosed herein provide processes and apparatus for tracking, analyzing and managing brand interactions. According to some embodiments, a computer system receives and recognizes a large volume of information descriptive of brand interactions from a variety of discrete source systems that do not directly communicate with one another. This brand interaction information may include information representative of a particular, predefined process executed by one of the discrete source systems and a brand enthusiast who triggered execution of the particular process. Upon receipt of brand interaction information, in this embodiment, the computer system stores associations between the brand interaction information, the brand enthusiast who triggered the creation of the brand interaction information, and the brand specified by the brand interaction information. This brand interaction information may be used to inspire brand loyalty within the brand enthusiasts through the use of rewards.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "some embodiments," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 27 is an exemplary interface display configured to display financial forecast information associated with a brand loyalty program;

Figure 28:
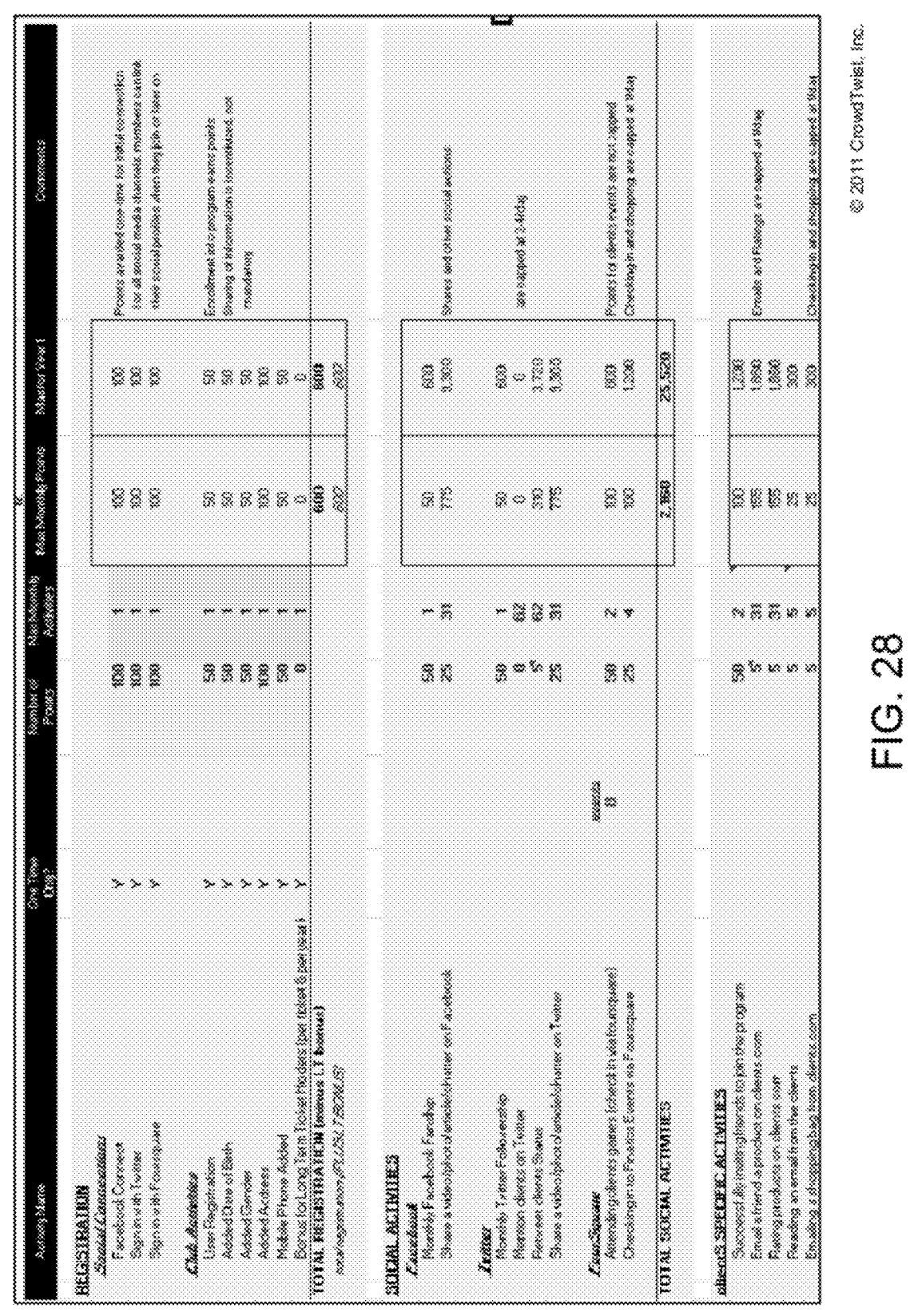

FIG. 28 is an exemplary interface display configured to display information descriptive of brand interactions and corresponding virtual currency values within a brand loyalty program;

DETAILED DESCRIPTION

Embodiments disclosed herein provide apparatus and processes for promoting loyalty to one or more brands by monitoring, managing, and rewarding brand interactions that occur relative to one or more channels. A brand interaction may include any activity that results in a computer system operating on data associated with a brand or other identifier of source, sponsorship or affiliation. Examples of activities that result in brand interactions include purchasing a branded product, visiting the website of a brand or reviewing content generated by or related to a brand. As described further below, in at least one embodiment, the apparatus and processes track brand interactions conducted by an individual across a plurality of websites, thus providing a complete and unified picture of the individual's activities relative to the brand.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Multi-Channel Loyalty Management System

Figure 1:
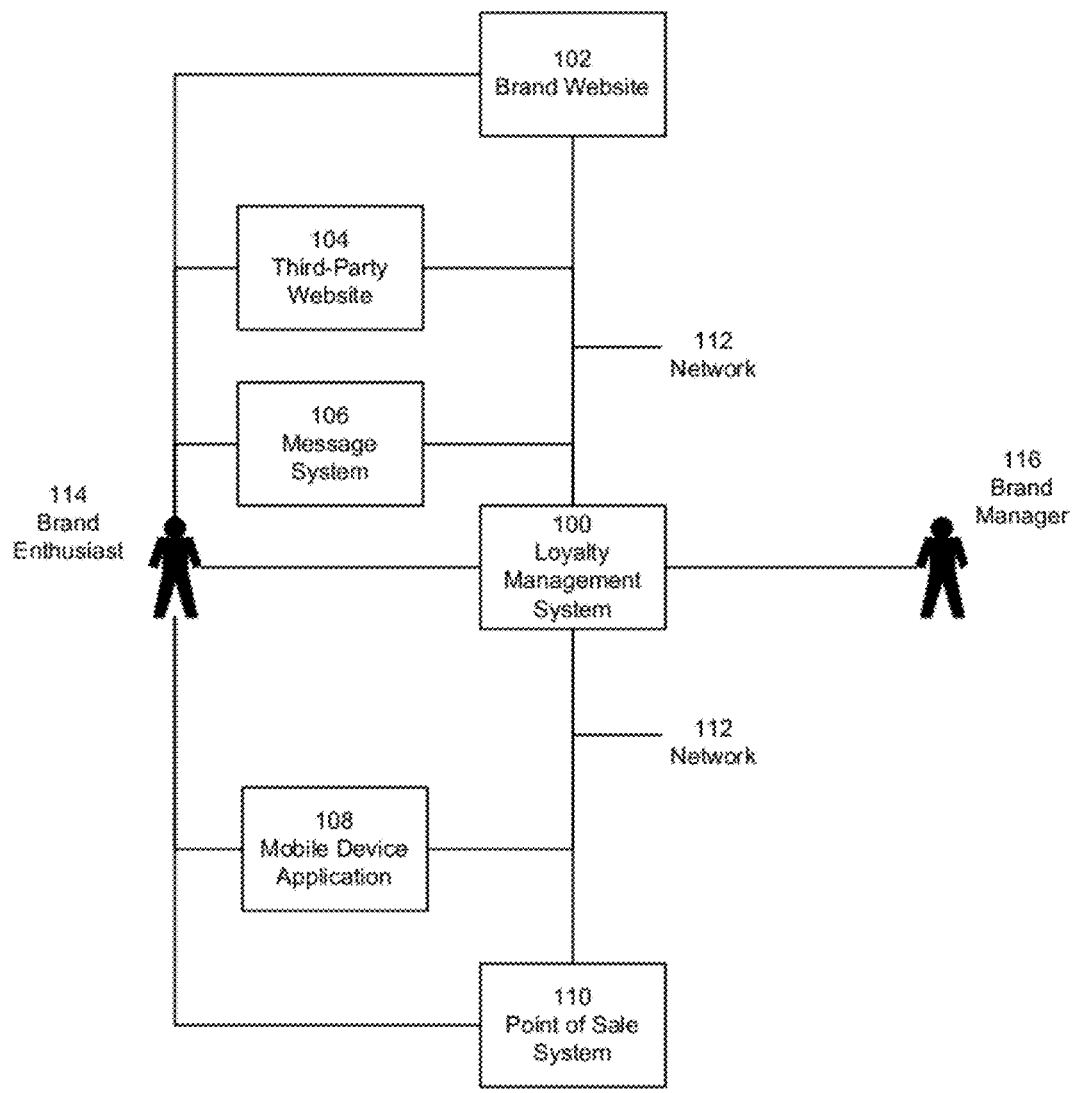
FIG. 1 is a context diagram including an exemplary loyalty management system.

Various embodiments implement a loyalty management system that is configured to manage brand interactions across multiple channels (e.g. source systems) using one or more computer systems. FIG. 1 illustrates one of these embodiments, a loyalty management system 100, within the context of several external entities. As shown in FIG. 1, these external entities include multiple, discrete source systems such as a brand website 102, a third-party website 104, a message system 106, a branded mobile device application 108, a point of sale system 110, a brand enthusiast 114, and a brand manager 116. The third-party website 104 may include one or more websites that host brand content. Examples of such websites include FACEBOOK, TWITTER, MYSPACE, FOURSQUARE, GMAIL, YAHOO! Mail, HOTMAIL, and AOL Mail. Like the loyalty management system 100, in this example, the brand website 102, the third-party website 104, the message system 106, the branded mobile device application 108, and a point of sale system 110 are also implemented using one or more computer systems. Each of these source systems represents a channel subject to potential tracking and management by the loyalty management system 100.

As shown in FIG. 1, the loyalty management system 100 receives activity information from the source systems via a network 112. This activity information may be descriptive of activities conducted by a user, such as the brand enthusiast 114, or may be descriptive of activities performed by the source systems in response to user conduct. The network 112, through which this activity information is received, may include any communication network through which computer systems may exchange information. For example, the network may be a public network, such as the internet, and may include other public or private networks such as LANs, WANs, extranets, and intranets.

According to various embodiments, the brand enthusiast 114 conducts a variety of activities using the loyalty management system 100 or any of the source systems illustrated in FIG. 1. The source systems record a subset of these activities and provide activity information describing the subset to the loyalty management system 100 via the network 112. In turn, the loyalty management system 100 receives, stores, and processes the activity information to determine any brand interactions indicated therein. Examples of brand interactions include following the brand website on TWITTER, visiting specific pages within the brand website, joining an email list associated with the brand, synchronizing an account on FACEBOOK with an account on the loyalty management system by providing the loyalty management system with logon credentials associated with the FACEBOOK account, reading an article associated with the brand, reading email provided via the loyalty management system, synchronizing an account on TWITTER with an account on the loyalty management system by providing the loyalty management system with logon credentials associated with the TWITTER account, becoming a "fan" of the brand website on FACEBOOK, providing additional profile data to the loyalty management system, inviting other brand enthusiasts to join the loyalty management system by creating an account thereon, providing a birthday of a brand enthusiast to the loyalty management website, mentioning the brand website on TWITTER, retweeting news associated with the brand on TWITTER, providing a phone number associated with a brand enthusiast to the loyalty management system, sharing information regarding the brand on TWITTER, synchronizing an account on FOURSQUARE with an account on the loyalty management system by providing the loyalty management system with logon credentials associated with the FOURSQUARE account, "checking-in" to an event associated with the brand using FOURSQUARE, "comment" on a FACEBOOK page associated with the brand, purchasing goods or services associated with the brand, and "liking" the status of the brand website on FACEBOOK. Other brand interactions may be included, as embodiments disclosed herein are not limited to the brand interactions enumerated above.

According to a particular example, the brand enthusiast 114 may visit the branded website 102 of her favorite band, "like" a comment from a band member on the third-party website 104 (for example, FACEBOOK), send an email to the band member using the message system 106 (for example, GMAIL), and download the branded mobile device application 108 for the band to her mobile phone. Each of these activities includes a brand interaction and, as a result of their execution, the source systems listed above send activity information containing brand interaction information to the loyalty management system 100. The loyalty management system 100 then processes the activity information to identify each of these brand interactions and stores data describing the brand interactions for subsequent processing.

According to one embodiment, the loyalty management system 100 scans the activity information for predetermined identifiers of brand interactions. These predetermined identifiers may include specific values in a variety of data fields, such as particular keywords within text fields, particular enumerated data types within record type fields, particular URLs within address fields, etc. In another embodiment, the activity information is indexed and the loyalty management system 100 utilizes the index to identify brand interactions. In still another embodiment, rather than receiving general activity information, the loyalty management system 100 requests and receives activity information that includes only brand interaction information.

In some embodiments, the subsequent processing performed by the loyalty management system 100 identifies brand interactions conducted on multiple source systems by the brand enthusiast 114 using different logon credentials for some or each of the source systems. In these embodiments, the loyalty management system 100 associates each brand interaction with an identifier of the brand enthusiast 114 designated within the loyalty management system 100. For instance, the loyalty management system 100 may designate the brand enthusiast 114 with the identifier, MJM, and may associate the MJM identifier with a tweet from LGM on TWITTER, with a "like" from NAM on FACEBOOK, and with a text from mobile phone number 555-1212, provided that the loyalty management system 100 has received associations between MJM, LGM, NAM, and 555-1212 via the brand enthusiast interface which is described further below with reference to FIG. 2. In this way, the loyalty management system 100 can analyze the collective brand interactions of the brand enthusiast 114 to determine metrics such as rank, influence, impact, and rewards for the brand enthusiast 114. Particular processes executed by the loyalty management system 100 upon stored information descriptive of brand interactions are described below with reference to FIGS. 2 and 33. The results of these processing activities are described further below with reference to FIGS. 17-28.

In other embodiments, the brand manager 116 interacts with the loyalty management system 100 to monitor and manage one or more brands through one or more brand loyalty programs for each brand. A brand loyalty program may include one or more predefined brand interactions that, when conducted by a brand enthusiast, are rewarded by the brand loyalty system 100. Using the loyalty management system 100, the brand manager 116 reviews several brand metrics analyzed along a variety of dimensions and adjusts rewards associated with particular types of brand interactions included in a brand loyalty program to influence the activity of brand enthusiasts. In at least one embodiment, the brand manager 116 benefits from information that is grouped by brand enthusiast and that is collected from a plurality of source systems, thereby providing a complete picture of brand enthusiast activity to the brand manager 116. FIGS. 17-28 illustrate screens that may be used by the brand manager 116 to perform these tasks. Particular processes conducted by the loyalty management system 100 to monitor and manage brands are described below with reference to FIGS. 2 and 29-33.

Figure 2:
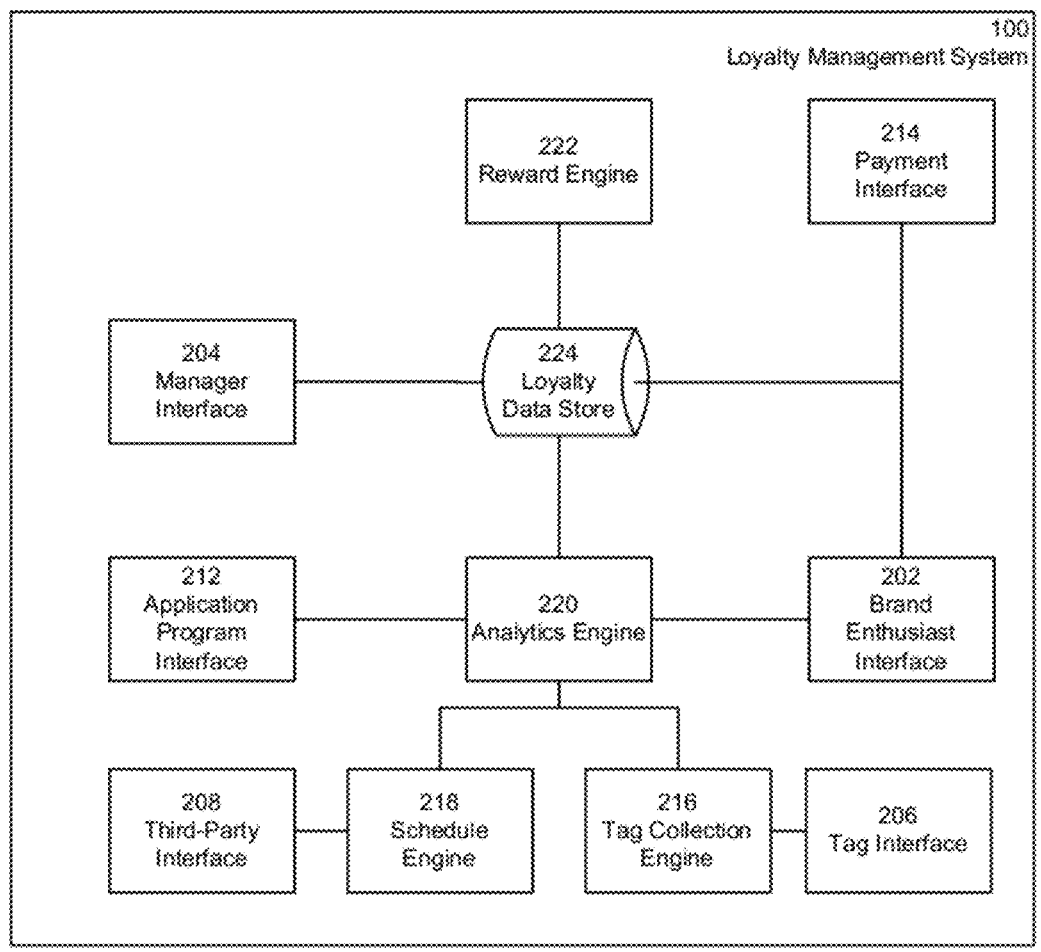
FIG. 2 is a schematic diagram of the loyalty management system shown in FIG. 1.

As shown in FIG. 2, the loyalty management system 100 includes a brand enthusiast interface 202, a manager interface 204, a tag interface 206, a third-party interface 208, an Application Program Interface (API) 212, a payment interface 214, a tag collection engine 216, a schedule engine 218, an analytics engine 220, a reward engine 222, and a loyalty data store 224. Information may flow between these components, or any of the elements, components and subsystems disclosed herein, using a variety of techniques. Such techniques include, for example, passing the information over a network using standard protocols, such as TCP/IP, passing the information between modules in memory and passing the information by writing to a file, database, data store, or some other non-volatile data storage device, or storage construct. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples and embodiments disclosed herein.

As illustrated in FIG. 2, the brand enthusiast interface 202 is configured to implement a user interface through which the loyalty management system 100 exchanges (i.e. provides or receives) a host of information with brand enthusiasts. For instance, in one embodiment, the brand enthusiast interface 202 presents one or more selectable brand interactions to brand enthusiasts via the user interface. Upon receipt of a selection of a brand interaction from a brand enthusiast, the brand enthusiast interface 202 provides another set of user interface elements through which the brand enthusiast performs the selected brand interaction. These user interface elements may include links to other systems, such as websites or other source systems, that support the selected brand interaction. In some embodiments, in response to receiving an indication that the brand enthusiast has selected a link to another system, the brand enthusiast interface 202 determines where logon credentials for the other system are stored within the loyalty data 224. If not, the brand enthusiast interface 202 requests logon credentials from brand enthusiast for the other system and stores information received in response to this request in the loyalty data store 224. Next, the brand enthusiast interface 202 establishes a connection to the other system using any logon credential information stored in the data store 224 for the selected system. The brand enthusiast may then complete the selected brand interaction using the established connection.

When the brand interaction is completed by the brand enthusiast interface 202, the brand enthusiast interface 202 provides brand interaction information to the analytics engine 220 for processing. As is described further below with reference to the rewards engine 222, these brand interactions sometimes result in an increase in the virtual currency available to a brand enthusiast. Virtual currency may be used to redeem actual rewards and also establishes a rank or level of brand enthusiast within a brand. Particular examples of screens that present selectable brand interactions are described further below with reference to FIGS. 4-7.

In another embodiment, the brand enthusiast interface 202 is configured to present a user interface through which the brand enthusiast interface 202 receives information descriptive of associations between a brand enthusiast and identifiers used by the brand enthusiast to access source systems. According to various embodiments, this user interface is implemented using a variety of elements and metaphors.

According to another embodiment, the brand enthusiast interface 202 is configured to present virtual currency for purchase via a user interface. Upon receipt of an indication that a brand enthusiast wishes to purchase the virtual currency, the brand enthusiast interface 202 exchanges payment information with the payment interface 214 to conduct the transaction. A particular example of a screen provided by the brand enthusiast interface 202 to enable purchase of virtual currency is described further below with reference to FIG. 8.

According to various embodiments, the manager interface 204 is configured to exchange information descriptive of brand loyalty program parameters. This brand loyalty program configuration information may specify the brand that is the subject of the brand loyalty program, rewards to be included in the brand loyalty program, brand interactions to be rewarded by the brand loyalty program, and virtual currency values and reward factors to be associated with the specified brand interactions. Examples of the elements and processes used to exchange brand loyalty program configuration information are described further below.

In one embodiment, the manager interface 204 is configured to exchange information descriptive of rewards offered within a brand loyalty program. This reward information may include individual reward items, the cost of each reward item in terms of virtual currency, sizes or other characteristics of available reward items, and categories into which reward items may be grouped. Particular examples of screens provided by the manager interface 204 to exchange this reward information are illustrated within FIGS. 9-13.

According to another embodiment, the manager interface 204 is configured to exchange reward factor information with brand managers via the user interface. This reward factor information may include a ranked priority of source systems that provide opportunities for brand interactions to brand enthusiasts. A particular example of the screen provided by the manager interface 204 to exchange reward factor information with brand managers is described further below with reference to FIG. 14.

In another embodiment, the manager interface 204 is configured to exchange email campaign information with brand managers via a user interface. This email campaign information may include information indicative of the performance of previously conducted campaigns or campaign configuration information specifying characteristics of campaigns yet to be executed. Particular examples of screens that present this information are described further below with reference to FIGS. 15-16.

In other embodiments, the manager interface 204 is configured to exchange summary information with brand managers via a user interface. For instance, in one embodiment, the manager interface 204 retrieves summarized loyalty data from the loyalty data store 224 and presents reports detailing brand enthusiast activity, influence, impact, and social reach to managers via the user interface. Particular examples of screens that present this information are described further below with reference to FIGS. 17-26.

Returning to the embodiment shown in FIG. 2, the tag interface 206 is configured to implement a hypertext transfer protocol (HTTP) based interface through which the loyalty management system 100 receives HTTP requests that include parameters specifying brand interaction information. These HTTP requests are generated when browsers execute code embedded within web pages served by branded websites, such as the branded web site 102. Upon receipt of brand interaction information, the tag interface 206 stores the brand interaction information within a queue managed by the tag collection engine 216. The tag collection engine 216 periodically, or in response to an indication that one or more tags resides within its queues, retrieves brand interaction information stored within its queues and forwards the brand interaction information to the analytics engine 220 for processing.

The third-party interface 208 is configured to implement a number of system interfaces through which the loyalty management system 100 exchanges data with discrete source systems. According to some embodiments, the third-party interface 208 utilizes one or more APIs exposed by the source systems to request data describing activities conducted within the source systems. In other embodiments, the third-party interface 208 monitors shared storage locations for files including activity data that are stored therein by the source systems. In other embodiments, the third-party interface 208 provides information stored in the loyalty system to external systems, such as customer relationship management systems. In this way, the customer relationship management systems are provided with data that describes a brand enthusiast's interactions with the brand across a plurality of source systems.

Each of the source systems may expose activity data via a different system interface and according to different schedule. For this reason, the loyalty management system 100 illustrated in FIG. 2 includes the scheduling engine 218. The scheduling engine 218 includes operational parameters that configure it to execute processes according to a predetermine schedule. In several embodiments, the scheduling engine 218 is configured to execute the third-party interface 208 for each interfaced source system based on the availability of activity data within the source system.

The API 212 is configured to implement a programmatic interface through which the loyalty management system 100 receives brand interaction information from discrete source systems. In one embodiment, the API 212 allows the source systems to push payloads of brand interaction information to the loyalty management system 100, thereby expediting the flow of information from the source systems to the loyalty system 100. The API 212 may be well suited for systems with sporadic or low bandwidth internet connectivity, such as some mobile phones, mobile computing devices and electronic point of sale systems.

The payment interface 214 is configured to implements a system interface through which the loyalty management system 100 exchanges payment information with external financial transaction processors. In at least one embodiment, the brand enthusiast interface 202 interoperates with the payment interface 214 to process brand enthusiast payments for goods, services or virtual currency. As is described further below, brand enthusiasts exchange virtual currency for rewards via the brand enthusiast interface 202.

Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the loyalty management system 100 or unauthorized access to the loyalty management system 100. Further examples of the processes executed by these interfaces are described further below with reference to FIGS. 29-31.

The analytics engine 220 is configured to analyze inbound activity information to determine whether the activity information represents an authentic brand interaction or a fraudulent attempt to "game" the loyalty management system 100. In one embodiment, the analytics engine 220 first determines a set of baseline values for metrics that are representative of normal, authentic behavior. The metrics for which baseline values are calculated may include activity velocity and activity overlap. Activity velocity characterizes the speed with which a brand enthusiast conducts multiple, sequential activities. Activity overlap is a measure of whether or how often a brand enthusiast performs multiple activities simultaneously or nearly simultaneously, for example when a brand enthusiast who retweets and coincidentally posts a comment on FACEBOOK. In one embodiment, should the metrics of any particular account transgress a threshold based on the baseline values, the analytics engine 220 flags the particular account as potentially fraudulent. In another embodiment, the value of the metrics is compared to the baseline values to calculate a gaming score that indicates the likelihood that a brand enthusiast who holds one or more accounts is acting in a fraudulent manner.

In another embodiment, the analytics engine 220 is configured to analyze email invitations and sign-ups to determine whether a brand enthusiast may be attempting to game the loyalty management system 100 using these activities. According to this embodiment, the analytics engine 220 analyzes the email address, name or other account information associated with new accounts for relationships (such as common data elements) with information used in the original account. In one embodiment, if a threshold number of accounts display similarities, the analytics engine 220 flags the group of accounts as being potentially fraudulent accounts. In another embodiment, the number of accounts with similarities is used to increase the gaming score of the brand enthusiast holding the accounts.

After flagging one or more accounts as potentially fraudulent, or after a brand enthusiast's gaming score exceeds a threshold value, the analytics engine 220 issues an alert to the brand enthusiasts associated with the flagged accounts or whose gaming score exceeds the threshold value. In one embodiment, the alert includes a series of emails indicating that the brand enthusiasts have been identified as conducting potentially fraudulent activities and requesting corrective action. This corrective action may include a request to discontinue identified activities or a request for the brand enthusiasts to contact the brand manager (or some other representative of the brand). In some embodiments, should the analytics engine 220 detect that corrective action has not be taken over a predefined period of time, the analytics engine 220 deactivates flagged accounts or accounts associated with brand enthusiasts having a gaming score that exceeds the threshold value. Information regarding a deactivated account may remain stored subsequent to deactivation of the account to enable identification of future attempts to game the loyalty management system 100. In other embodiments, the analytics engine 220 prevents any rewards from being issued to the holder of a flagged account, until the activity credited to the account is deemed authentic and the flag is removed by the brand manager. Thus, the analytics engine 220 provides identification and protection against fraudulent brand interactions.

In another embodiment, the analytics engine 220 is configured to analyze loyalty data to determine a score that reflects the social influence of brand enthusiasts. According to this embodiment, the analytics engine 220 determines the social influence score of a brand enthusiast based on the number of contacts associated with the brand enthusiast stored in the loyalty data store 224 and a conversion metric that characterizes the rate at which links provided by the brand enthusiast to others are followed. These links may include URLs sent via email, FACEBOOK or TWITTER. In one embodiment, to determine the conversion metric of a brand enthusiast, the analytics engine 220 divides the number of URLs sent by the brand enthusiast by the number of requests received for the URLs sent. After the analytics engine 220 determines the number of contacts and the conversion applicable to a brand enthusiast, the analytics engine 220 calculates the social influence score of the brand enthusiast by multiplying the number of contacts by the conversion of the brand enthusiast.

In other embodiments, the analytics engine 220 is configured to incorporate other factors when determining social influence score. For instance, in one embodiment, the analytics engine 220 further adjusts the calculated social influence score by adjusting the score up or down by the sentiment expressed toward the brand enthusiast by others. Sentiment may be determined directly, such as through a "like" of the brand enthusiast in FACEBOOK, or indirectly, such as by scanning comments associated with a brand enthusiast for sentiment keywords.

In another embodiment, the analytics engine 220 is configured to adjust the social influence score according to a brand enthusiast's frequency of use of a particular website. More frequent use is indicative of higher levels of commitment to the brand and, therefore, a greater likelihood of more influence with other brand enthusiasts. In another embodiment, the analytics engine 220 adjusts the social influence score to reflect the frequency with which a brand enthusiast posts comments or shares information in other ways. More frequent sharing of information is indicative of greater social influence. In still another embodiment, the analytics engine 220 adjusts the social influence score by incorporating a brand enthusiast's gaming score into the analysis. A higher gaming score indicates that the brand enthusiast's interactions are less likely to influence others. In yet another embodiment, the analytics engine 220 adjusts the social influence score of a brand enthusiast based on coincidence of actions between the brand enthusiast and other brand enthusiasts within a predefined period of time. These actions may include interacting with a brand website, sending a message regarding the brand, and purchasing branded goods.

The manner in which the analytics engine 220 incorporates the various factors described above into the social influence score varies between embodiments. In one embodiment, the analytics engine 220 applies configurable weighs to each factor, prior to applying the factor to the social influence score. For example, in this embodiment, a negative gaming score may weigh more heavily on the social influence score than a negative sentiment indicator.

In other embodiments, the analytics engine 220 is configured to analyze loyalty data to determine a score that reflects the impact of brand enthusiasts. In these embodiments, the impact score characterizes monetary or economic sway held by a brand enthusiast. In one embodiment, the analytics engine 220 determines the impact score of a brand enthusiast based on the amount of purchases associated with the brand enthusiast stored in the loyalty data store 224 and a correlation metric that characterizes a correlation between the brand enthusiast's communications, purchases, or other activity and purchases made by others. In another embodiment, to increase confidence in the correlation metric, the analytics engine 220 limits calculation of the correlation to data descriptive of the brand enthusiast's activities and purchases made by others who have an established social connection with the brand enthusiast.

In other embodiments, the analytics engine 220 is configured to analyze loyalty data to determine a variety of other metrics. Examples of these metrics include but are not limited to: total number of brand enthusiasts holding accounts on the loyalty management system 100; the number of new brand enthusiasts who opened an account within a predetermined time period; the number of brand enthusiasts who are active (within the loyalty management system 100 or whose activity elsewhere contributes to data stored on the loyalty management system 100) within a predetermined time period (e.g., a week, month, or year); the percentage of the total number of brand enthusiasts who were active within a predetermined time period; a statistical summary characterizing the number of actions performed per brand enthusiast over a predetermined period of time; the total amount of virtual currency earned by a set of one or more brand enthusiasts; the total amount of virtual currency redeemed by a set of one or more brand enthusiasts; the total amount of virtual currency remaining for a set of one or more brand enthusiasts; the total number of social media impressions posted over a predetermined period of time detected by the loyalty management system 100; the total number of impressions with links to the loyalty management system 100; the total number of site visits generated by the loyalty management system 100; the clickthrough rate of the loyalty management system 100 (e.g., the percentage of links posted by one or more brand enthusiasts using the loyalty management system 100 that are followed within a predetermined time period and across multiple source systems (e.g., FACEBOOK, TWITTER)); the cumulative amount of virtual currency redeemed by one or more brand enthusiasts; the virtual currency redemption rate of one or more brand enthusiasts; the percentage of virtual currency redeemed by one or more brand enthusiasts; the number of page views recorded for one or more brand enthusiasts over a predetermined time period (e.g., a week, month, or year); the number of page views recorded for one or more guests over a predetermined time period (e.g., a week, month, or year); a lift multiple that characterizes a growth factor in overall spending brought about by implementation of a brand loyalty program; the number of posts on other websites with backlinks to the loyalty management system 100; the total number of visits to the loyalty management system 100 over a predefined time period; a percentage of social impressions including clickable information posted by a brand enthusiast that are clicked by others socially connected to the brand enthusiast; the percentage of backlinks to the loyalty management system 100 that are followed; the number of FACEBOOK fans of the brand; the number of brand followers on TWITTER; the number of social media impressions over a predefined time period (e.g., a week, month, or year); the average basket amount of purchase and virtual currency redemption activities for one or more brand enthusiasts over a predefined time period; a basket lift that characterizes a growth factor in the average amount of currency spent in an average purchase brought about by implementation of a brand loyalty program; a statistical summary characterizing coupon usage detected by the loyalty management system 100. Additional examples of processes executed by the analysis engine 220 are described further below with reference to FIGS. 29 and 32-33.

The reward engine 222 is configured to retrieve loyalty data from the loyalty data store 224 and processes the data to determine virtual currency for brand enthusiasts. According to one embodiment, to determine any virtual currency due a particular brand enthusiast, the reward engine first retrieves any brand interactions stored in the loyalty data store 224 that are associated with the particular brand enthusiast and that have not yet been processed by the reward engine 222. Next, the reward engine 222 determines a value of virtual currency associated with each brand interaction and a reward factor to be applied to each brand interaction. The amount of virtual currency and the reward factor applicable to a brand interaction may vary based on the characteristics of the brand interaction.

For instance, in one embodiment, the reward engine 222 groups brand interactions by source system or by some other characteristic, and these groups are ranked. The reward engine 222 then assigns a reward factor to each brand interaction in the group based on the rank of the group. A higher ranking equates to a higher reward factor. Further, in some embodiments, each brand interaction is assigned a value of virtual currency based on a set of rules that reflect the value of the brand interaction to the brand manager. These rules may operate on an importance of each brand interaction within each group (for example, a twitter follow is more important that a retweet) and may cap the value of virtual currency assigned based on other instances of brand interactions (for example, only the first two retweets are assigned a positive virtual currency value).

After determining the value of virtual currency and the reward factor applicable to each brand interaction, the reward engine 222 is configured to determine an additional amount of virtual currency due to the particular brand enthusiast by multiplying the value of virtual currency associated with each brand interaction by its applicable reward factor. The reward engine 222 completes its processing by summing the additional amount of virtual currency with the previous balance of virtual currency associated with the particular brand enthusiast. In some embodiments, the reward factors and the values of virtual currency associated with each brand interaction are configurable parameters that may be altered via the manager interface 204 to increase or decrease the virtual currency produced by the reward engine 222. This feature enables brand managers to alter the incentive structure provided to brand enthusiasts and, thereby, influence the activities selected by brand enthusiasts to perform. Further examples of processes executed by the reward engine 222 are described further below with reference to FIGS. 29 and 33.

The loyalty data store 224 stores all of the information used by the various components and elements of the loyalty management system 100. The types of information stored within the loyalty data store 224 include data describing users, such as brand enthusiasts and brand managers, brand interaction information, campaign information, and a wide variety of other information. In at least one embodiment, the loyalty data store 224 includes associations between identifiers of individual brand enthusiasts and logon credentials used to access each of the loyalty management system 100 and each of the source systems. The loyalty data store 224 includes auditable tracking logs of all information and summary tables that are periodically (for example, once a minute) updated to facilitate aggregate level reporting.

Information within the loyalty management system 100, including data within the loyalty data store 224, may be stored in any logical construction capable of holding information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Embodiments of the loyalty management system 100 are not limited to the particular configuration illustrated in FIG. 2. Various embodiments utilize a variety of hardware components, software components and combinations of hardware and software components configured to perform the processes and functions described herein. In some embodiments, the loyalty management system 100 is implemented using a distributed computer system, such as the distributed computer system described further below with regard to FIG. 3.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones, and personal digital assistants, and network equipment, such as load balancers, routers, and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 3:
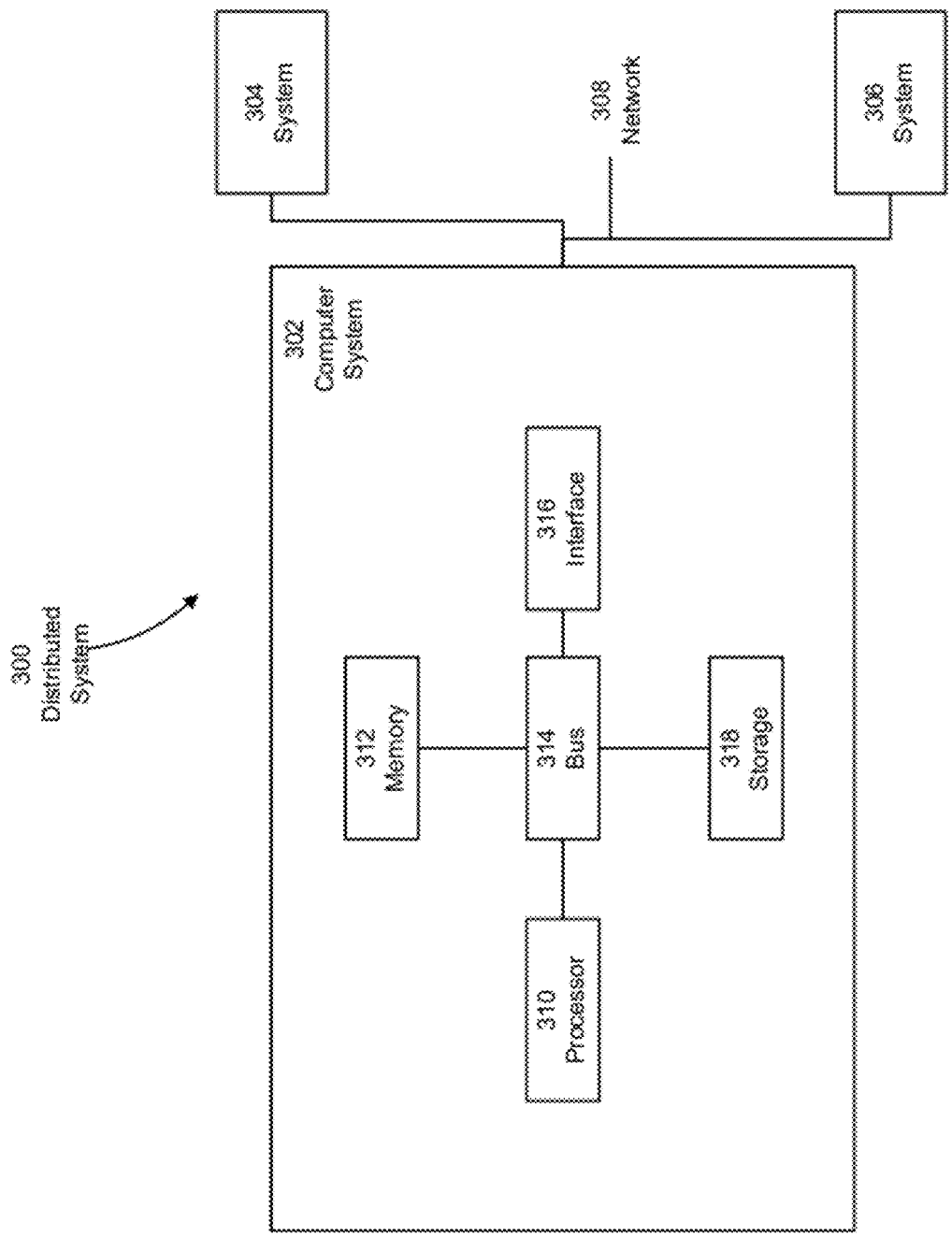
FIG. 3 is a schematic diagram of one example of a computer system that may perform processes and functions disclosed herein.

Referring to FIG. 3, there is illustrated a block diagram of a distributed computer system 300, in which various aspects and functions are practiced. As shown, the distributed computer system 300 includes one more computer systems that exchange information. More specifically, the distributed computer system 300 includes computer systems 302, 304, and 306. As shown, the computer systems 302, 304, and 306 are interconnected by, and may exchange data through, a communication network 308. The network 308 may include any communication network through which computer systems may exchange data. To exchange data using the network 308, the computer systems 302, 304, and 306 and the network 308 may use various methods, protocols, and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 302, 304, and 306 may transmit data via the network 308 using a variety of security measures including, for example, TLS, SSL or VPN. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, a bus 314, an interface 316, and data storage 318. To implement at least some of the aspects, functions and processes disclosed herein, the processor 310 performs a series of instructions that result in manipulated data. The processor 310 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 310 is connected to other system components, including one or more memory devices 312, by the bus 314.

The memory 312 stores software programs and data during operation of the computer system 302. Thus, the memory 312 may be a relatively high performance, volatile, random access memory such as a dynamic random access memory (DRAM) or static memory (SRAM). However, the memory 312 may include any device for storing data, such as a disk drive or other non-volatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the bus 314. The bus 314 may include one or more physical busses, for example, busses between components that are integrated within a same machine, but may include any communication coupling between system elements including specialized or standard computing bus technologies such as IDE, SCSI, PCI and InfiniBand. The bus 314 enables communications, such as data and instructions, to be exchanged between system components of the computer system 302.

The computer system 302 also includes one or more interface devices 316 such as input devices, output devices, and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems.

The data storage 318 includes a computer readable and writeable nonvolatile, or non-transitory, data storage medium in which instructions are stored that define a software program or other object that is executed by the processor 310. The data storage 318 also may include information that is recorded, on or in, the medium, and that is processed by the processor 310 during execution of the software program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage 318. The memory may be located in the data storage 318 or in the memory 312, however, the processor 310 manipulates the data within the memory, and then copies the data to the storage medium associated with the data storage 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Exemplary Interface Screens

Figure 4:
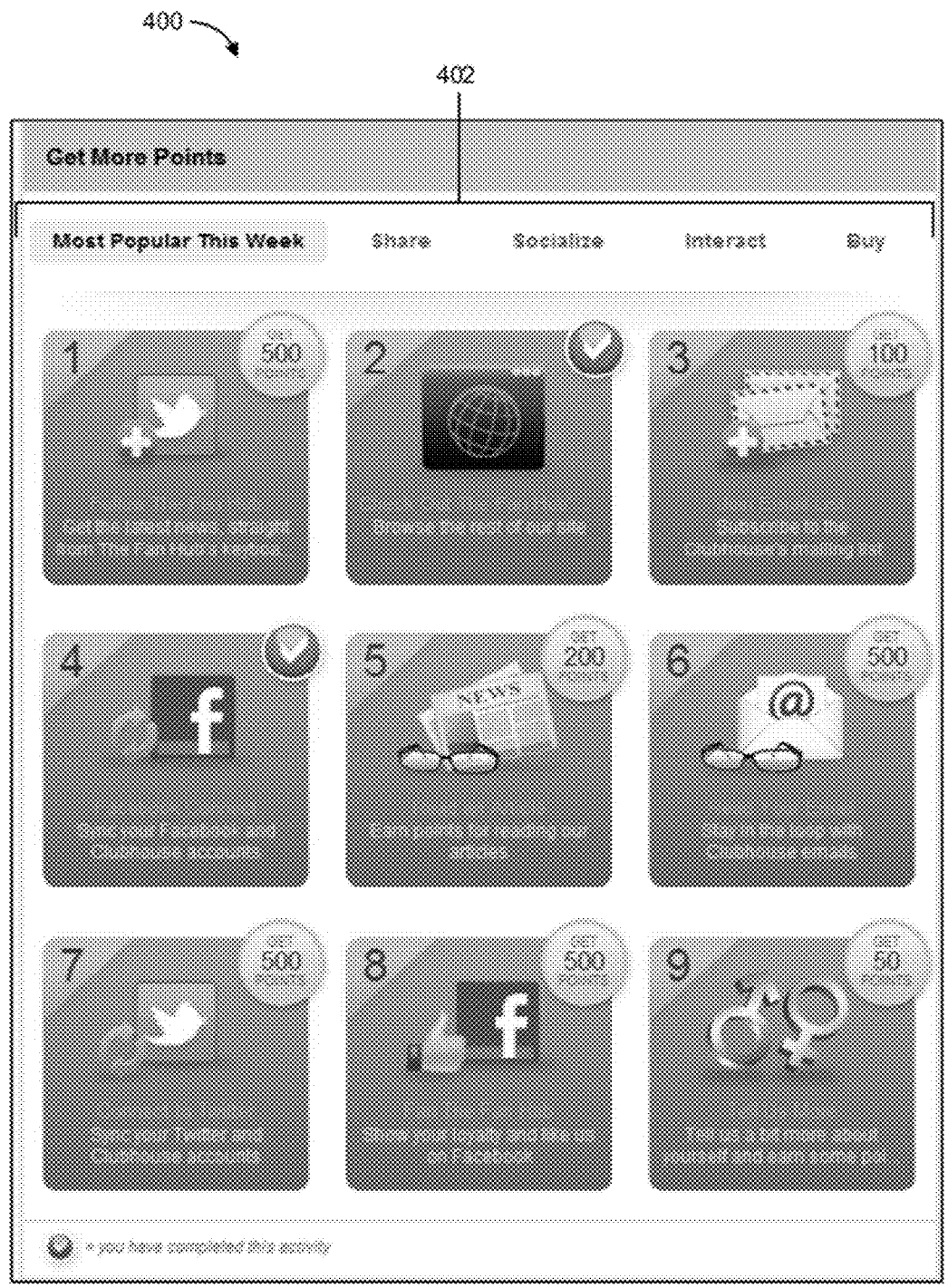
FIG. 4 is an exemplary interface display configured to receive an activity selection from a user.
Figure 5:
FIG. 5 is another exemplary interface display configured to receive an activity selection from a user.
Figure 6:
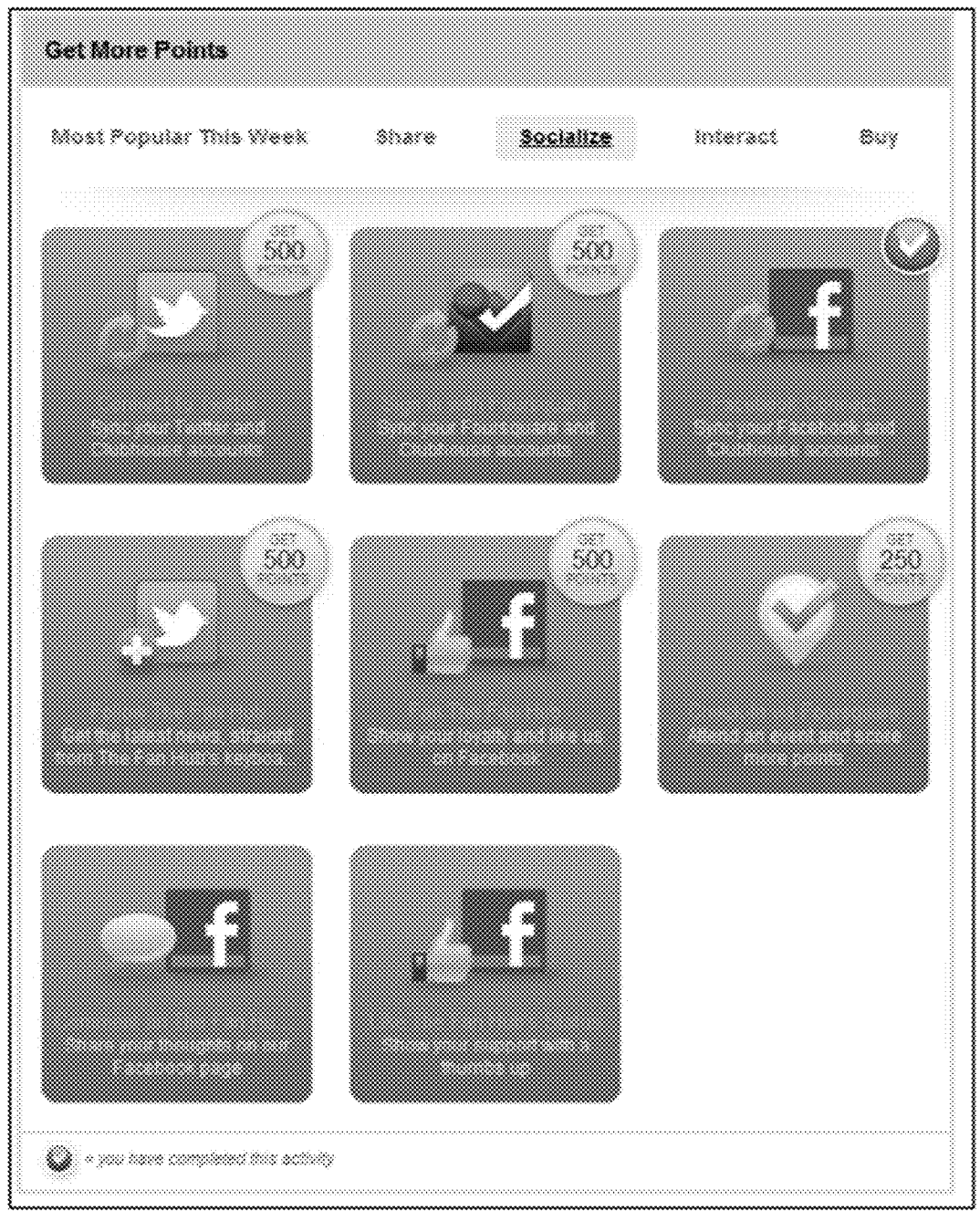
FIG. 6 is another exemplary interface display configured to receive an activity selection from a user.
Figure 7:
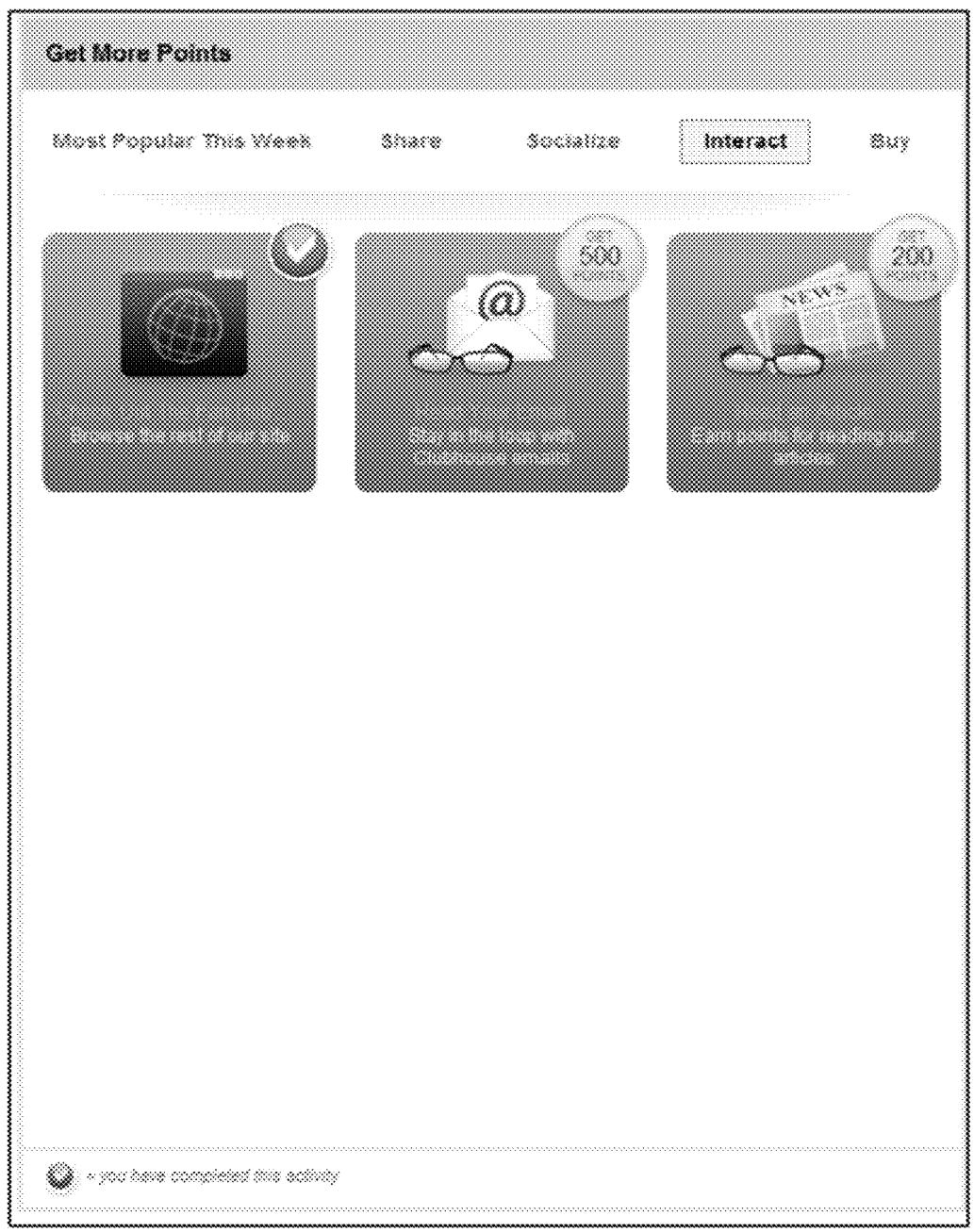
FIG. 7 is another exemplary interface display configured to receive an activity selection from a user.

In some embodiments, the brand enthusiast interface 202 provides brand enthusiasts with brand interaction opportunities via a set of user interface screens. FIG. 4 depicts one embodiment of such a user interface screen, the screen 400. As shown in FIG. 4, the screen 400 includes a tab control 402 that displays groups of brand interactions for selection. In the embodiment shown, the tab control 402 includes groups named "Most Popular This Week," "Share," "Socialize," "Interact," and "Buy." The "Most Popular This Week" tab includes nine selectable brand interaction opportunities that are numbered 1-9. These brand interactions include following the brand on TWITTER, "fanning" the brand on FACEBOOK, syncing the brand enthusiast's FACEBOOK and branded site accounts, syncing the brand enthusiast's TWITTER and branded site accounts, subscribing to an email list, reading email, reading an article and sharing personal information. In response to detecting a selection of any of the screen areas corresponding to these activities, the brand enthusiast interface 202 provides access to user interface elements required to perform the activity. FIG. 5 illustrates the brand interactions grouped under the "Share" tab. FIG. 6 shows the brand interactions grouped under the "Socialize" tab. FIG. 7 depicts the brand interactions grouped under the "Interact" tab.

Figure 8:
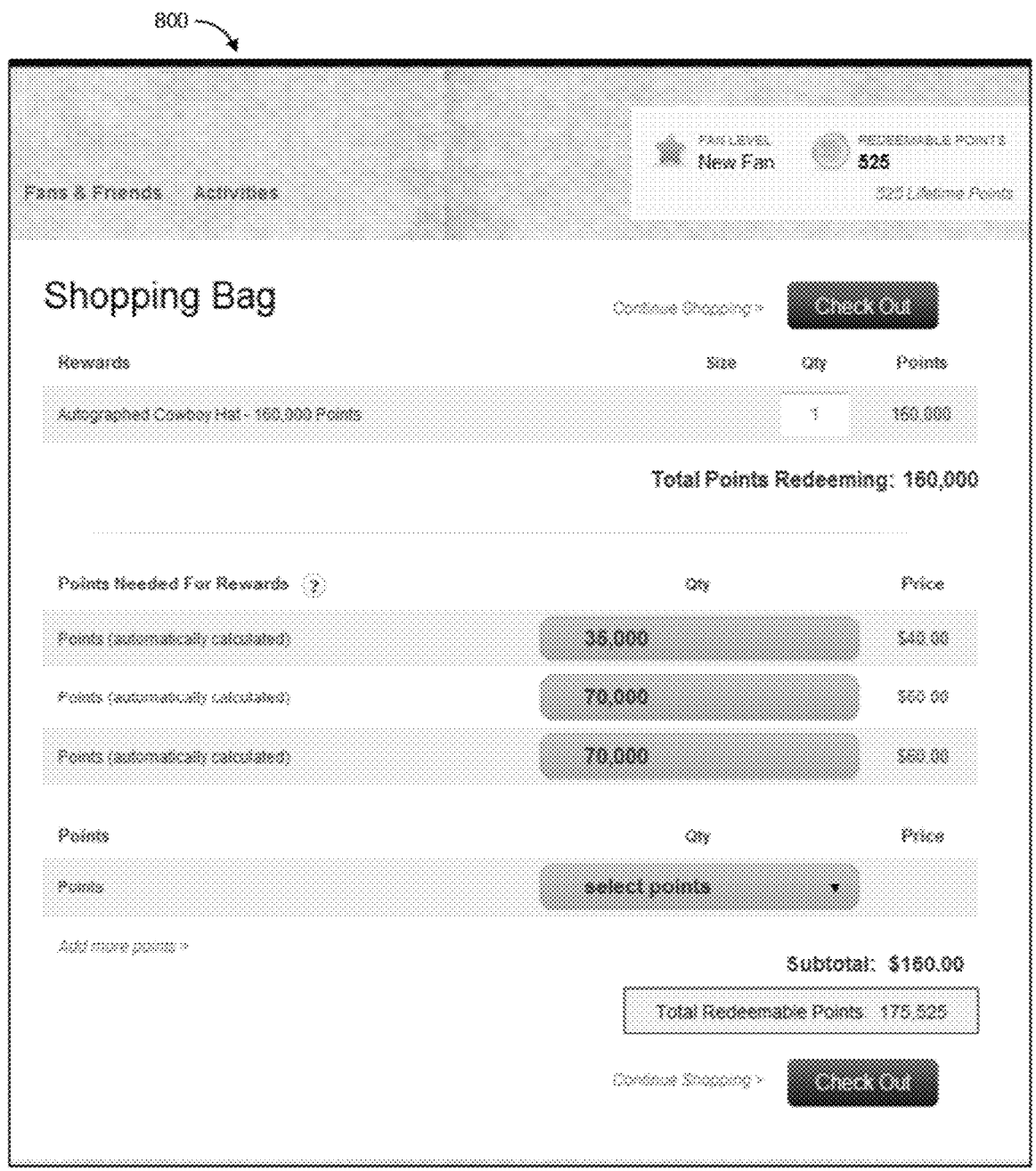
FIG. 8 is an exemplary interface display configured to receive payment for virtual currency.

Some embodiments provide screens that provide virtual currency in exchange for payment. FIG. 8 illustrates a screen 800 of one such embodiment. As shown in FIG. 8, the screen 800 includes automatically calculated virtual currency ("Points") line items that specify amounts that must be purchased and added to the existing virtual currency balance to purchase the listed reward. Upon receiving a selection of the "Check Out" button, the brand enthusiast interface 202 processes payment for the virtual currency and listed reward via the payment interface 214. While screen 800 illustrates the purchase of virtual currency during the process of purchasing an actual reward, other embodiments provide screens for purchasing virtual currency alone.

Figure 9:
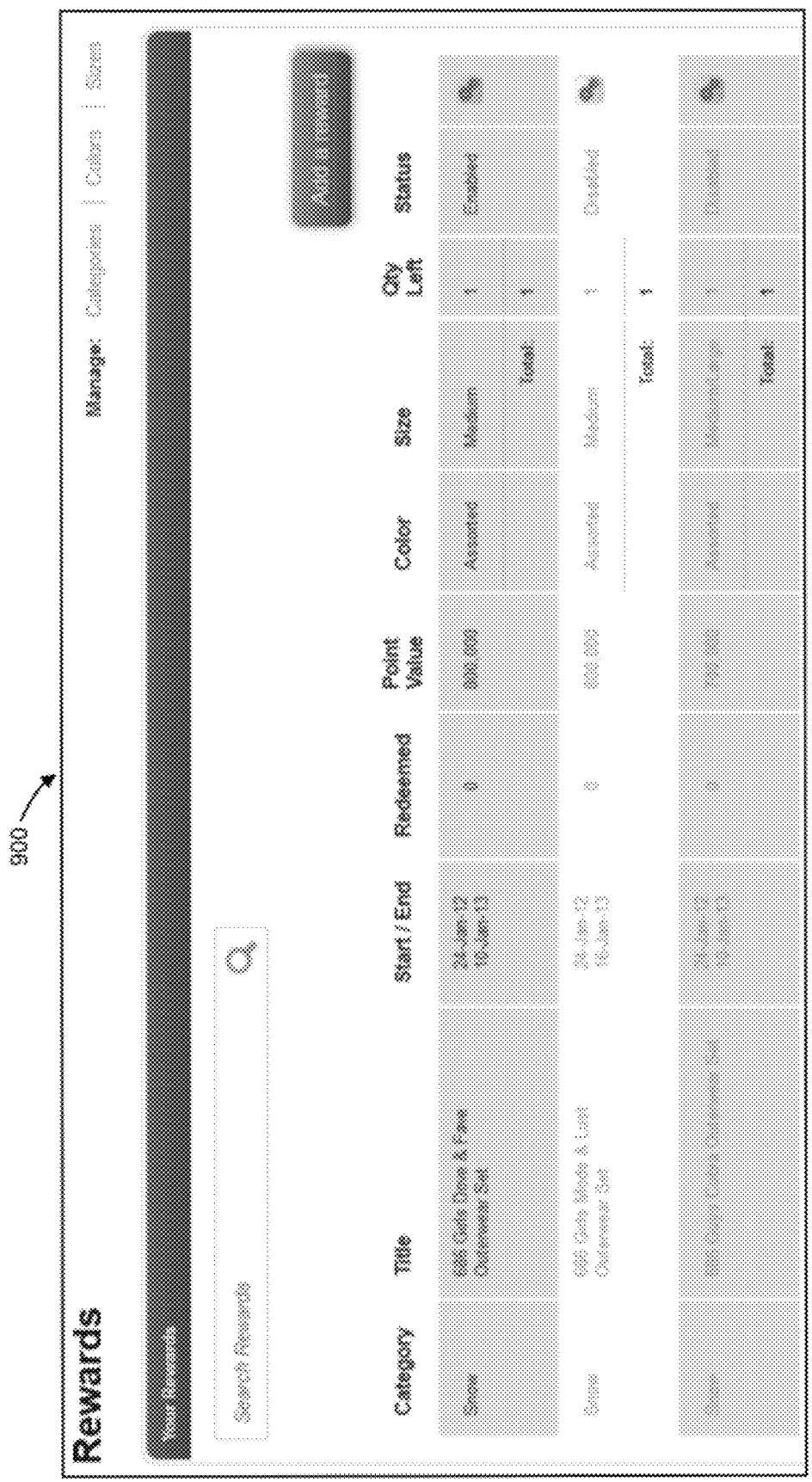
FIG. 9 is an exemplary interface display configured to exchange information regarding rewards available in exchange for virtual currency.
Figure 10:
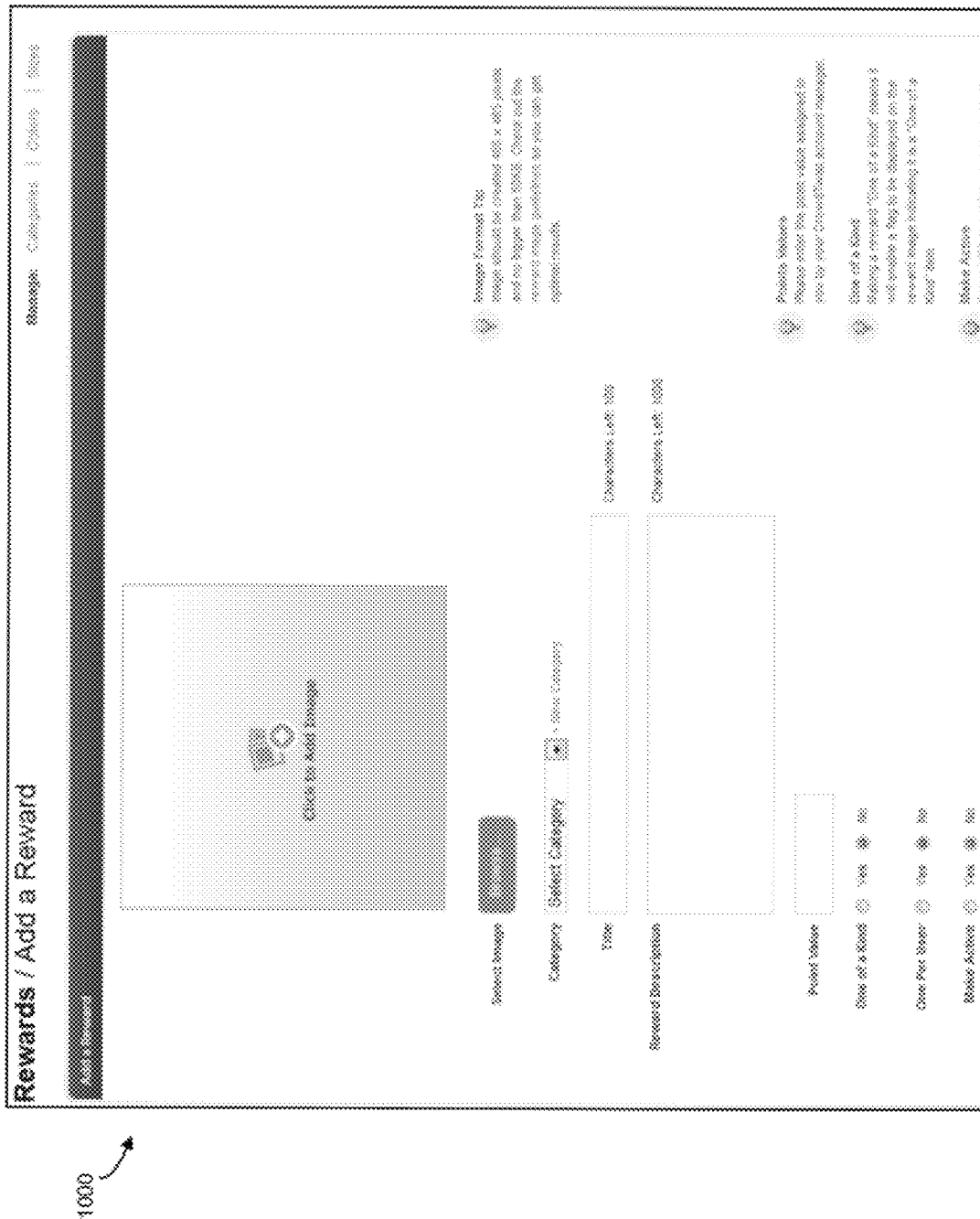
FIG. 10 is an exemplary interface display configured to receive information descriptive of a new reward to be added to a brand loyalty program.
Figure 11:
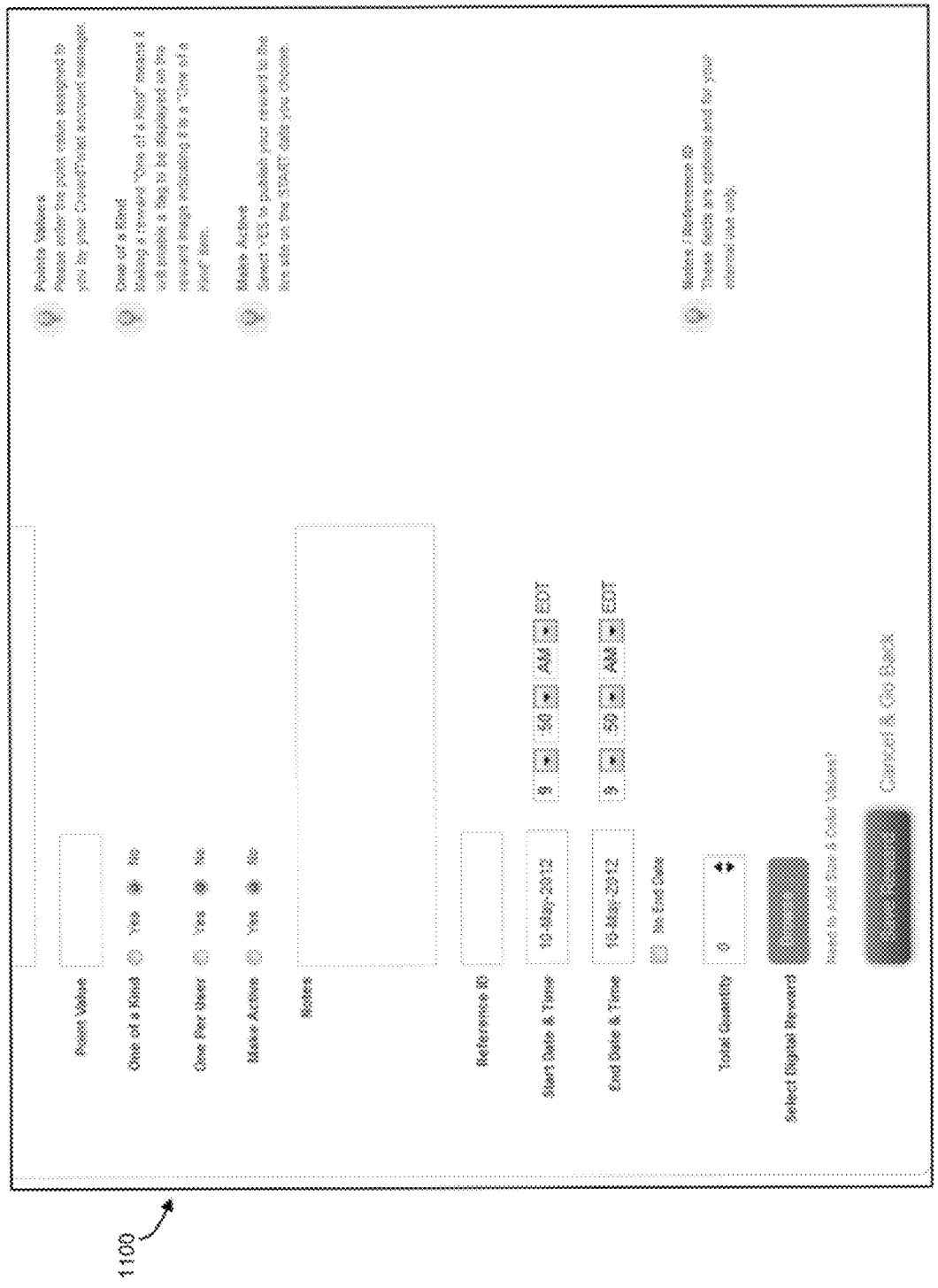
FIG. 11 is another exemplary interface display configured to receive information descriptive of a new reward to be added to a brand loyalty program.
Figure 12:
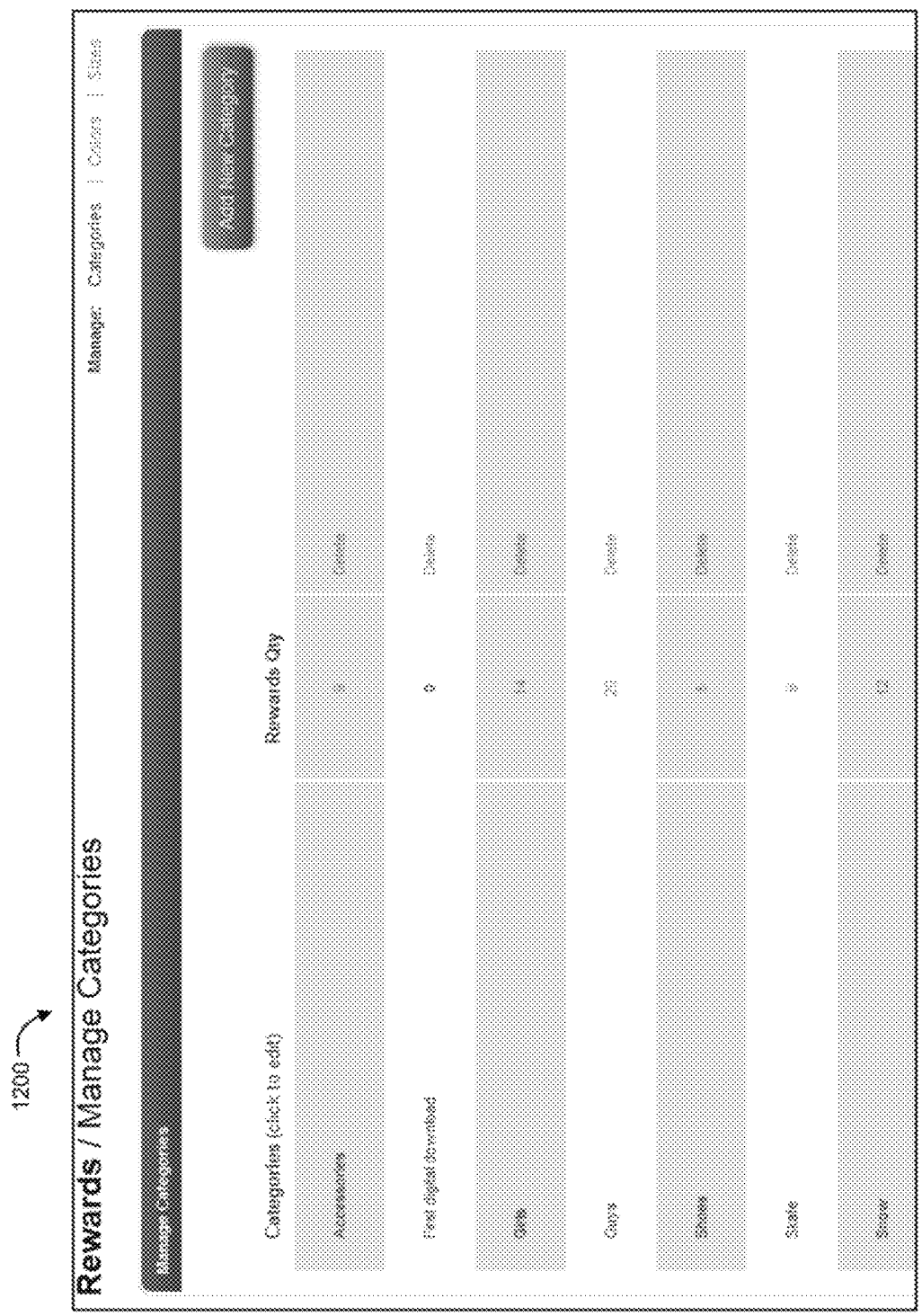
FIG. 12 is an exemplary interface display configured to exchange information regarding categories of rewards available in exchange for virtual currency.
Figure 13:
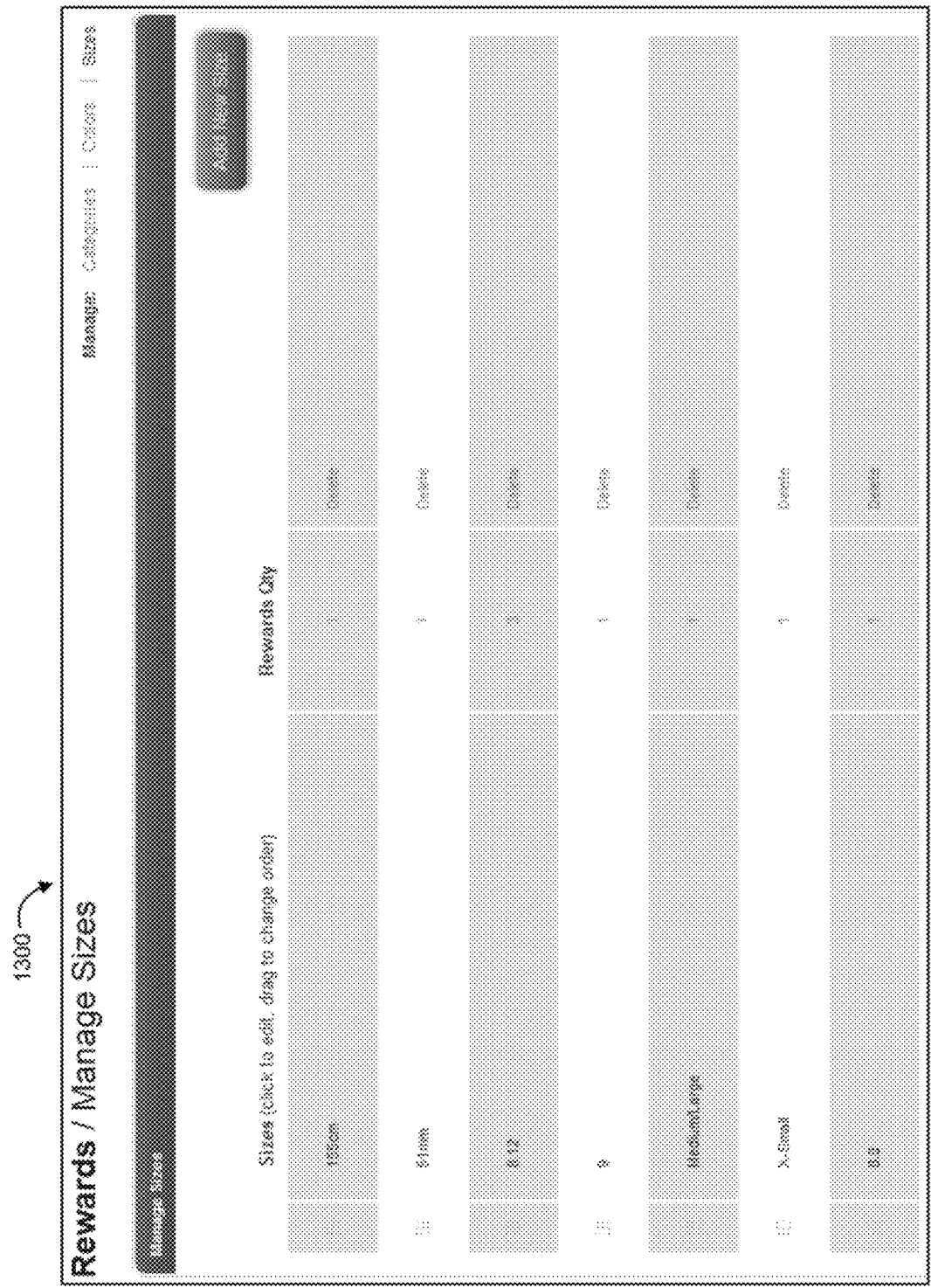
FIG. 13 is an exemplary interface display configured to exchange information regarding sizes of rewards available in exchange for virtual currency.

In other embodiments, the manager interface 204 is configured to provide brand managers with the ability to manage rewards that are offered within a brand loyalty program. FIGS. 9-13 illustrate screens that are provided by the manager interface 204 according to various embodiments. As illustrated in FIG. 9, the screen 900 includes elements that display information descriptive of rewards associated with a brand loyalty program and actionable elements through which the manager interface 204 receives requests to add a new reward or search stored reward information. As shown in FIGS. 10 AND 11, the screen 1000 and its continuation, the screen 1100, include elements through which the manager interface 204 receives elements of data used to setup a new reward. As depicted in FIG. 12, the screen 1200 includes elements that display information descriptive of categories used to group rewards and actionable elements through which the manager interface 204 receives requests to add new categories or edit stored categories. As illustrated in FIG. 13, the screen 1300 includes elements that display information descriptive of sizes in which rewards are made available and actionable elements through which the manager interface 204 receives requests to add new sizes or edit stored sizes.

Figure 14:
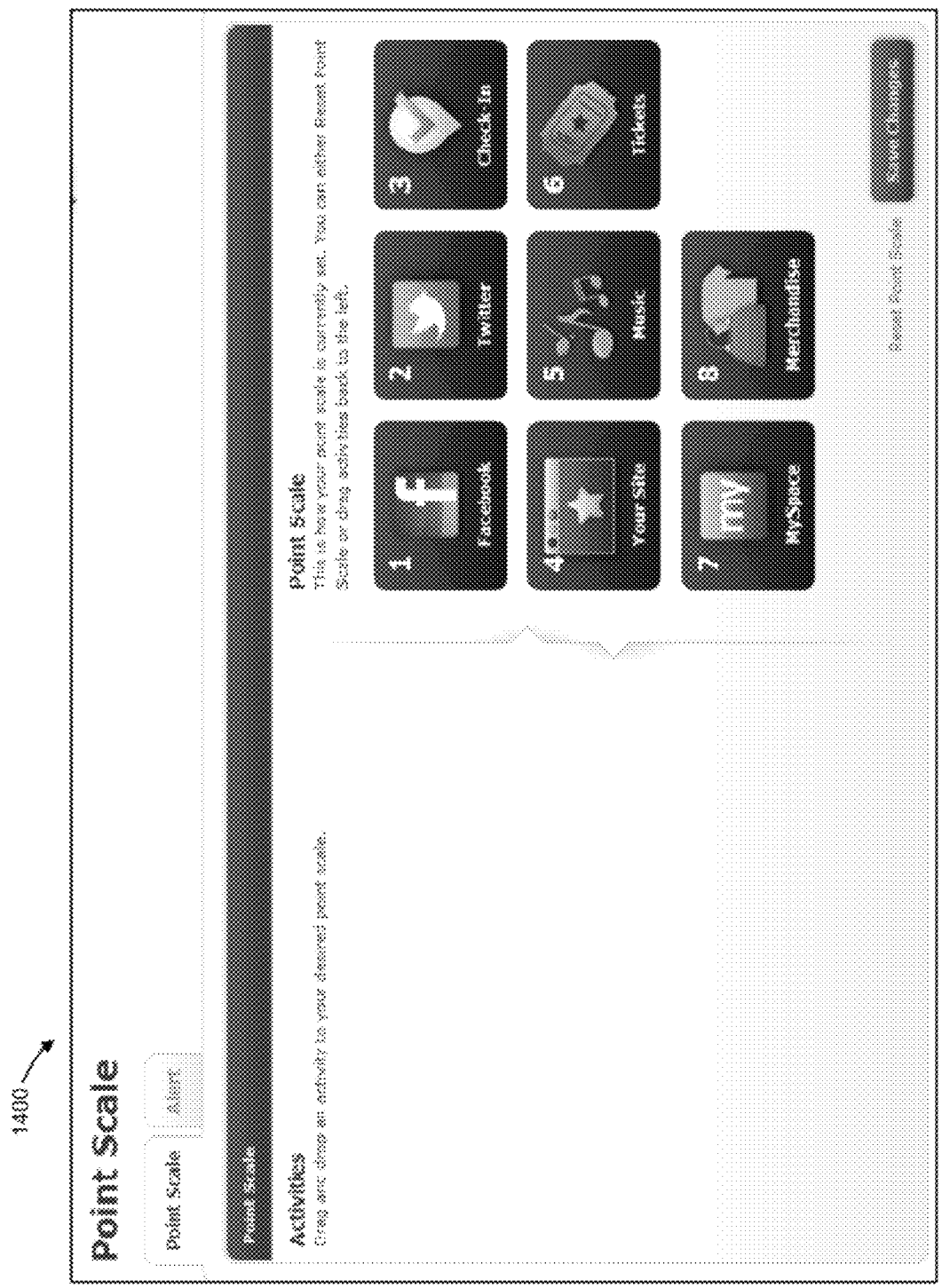
FIG. 14 is an exemplary interface display configured to receive reward factor configuration information.

According to some embodiments, the manager interface 204 is configured to exchange reward factor information with a brand manager via a user interface screen. This reward factor information may include one or more requests to alter a rank associated with a reward factor. FIG. 14 depicts an example of a screen 1400 that may be provided by the manager interface 204 according to these embodiments.

As shown in FIG. 14, the screen 1400 includes eight configurable screen areas number 1-8. Each of these areas corresponds to a source system or a collection of brand interactions. The number displayed within each screen area corresponds to a reward factor rank for brand interactions associated with the source system or collection represented by the screen area. In this embodiment, responsive to receipt of a request to rearrange the current configuration of screen areas (such as a drag and drop of one screen area to another), the manager interface 204 rearranges the locations of the screen areas, but leaves the location of the number static. Next, the manager interface 204 adjusts the reward factors according to the new rank displayed in association with each. In this way, the screen 1400 enables reconfiguration of reward factors to allow brand managers to alter the reward structure of the brand loyalty program and thereby influence brand enthusiast behavior.

Figure 15:
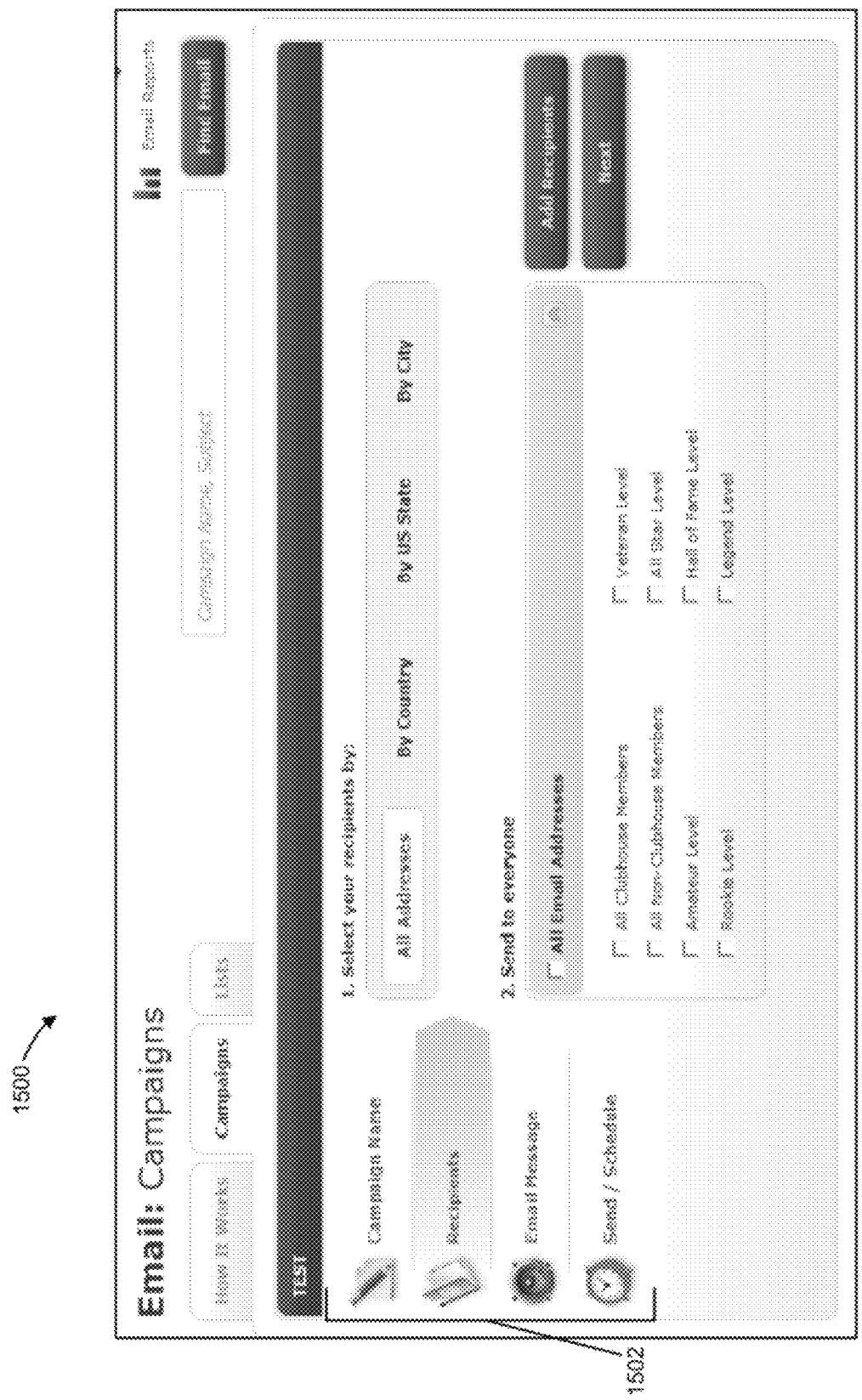
FIG. 15 is an exemplary interface display configured to display email management information.
Figure 16:
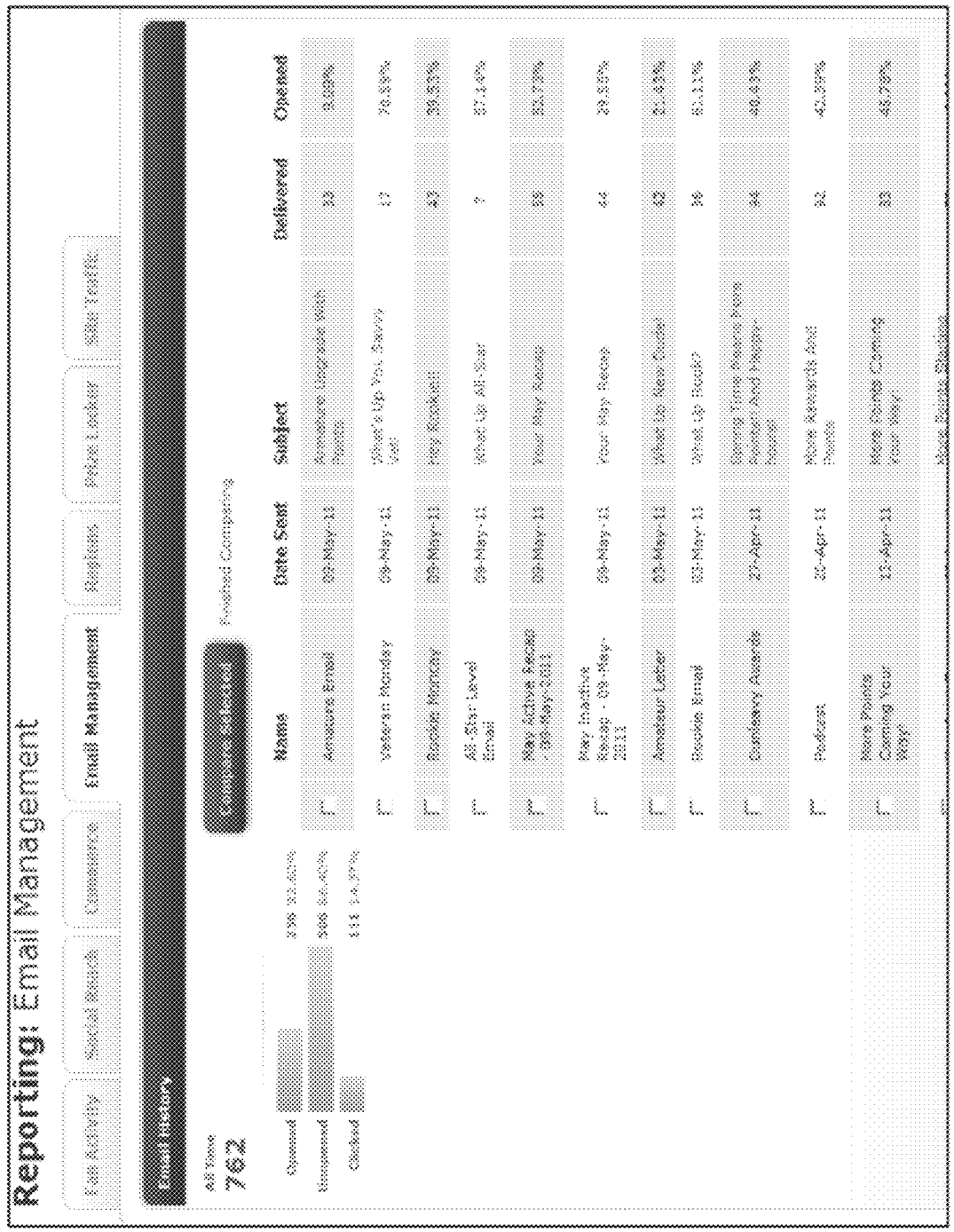
FIG. 16 is an exemplary interface display configured to receive email campaign information.
Figure 17:
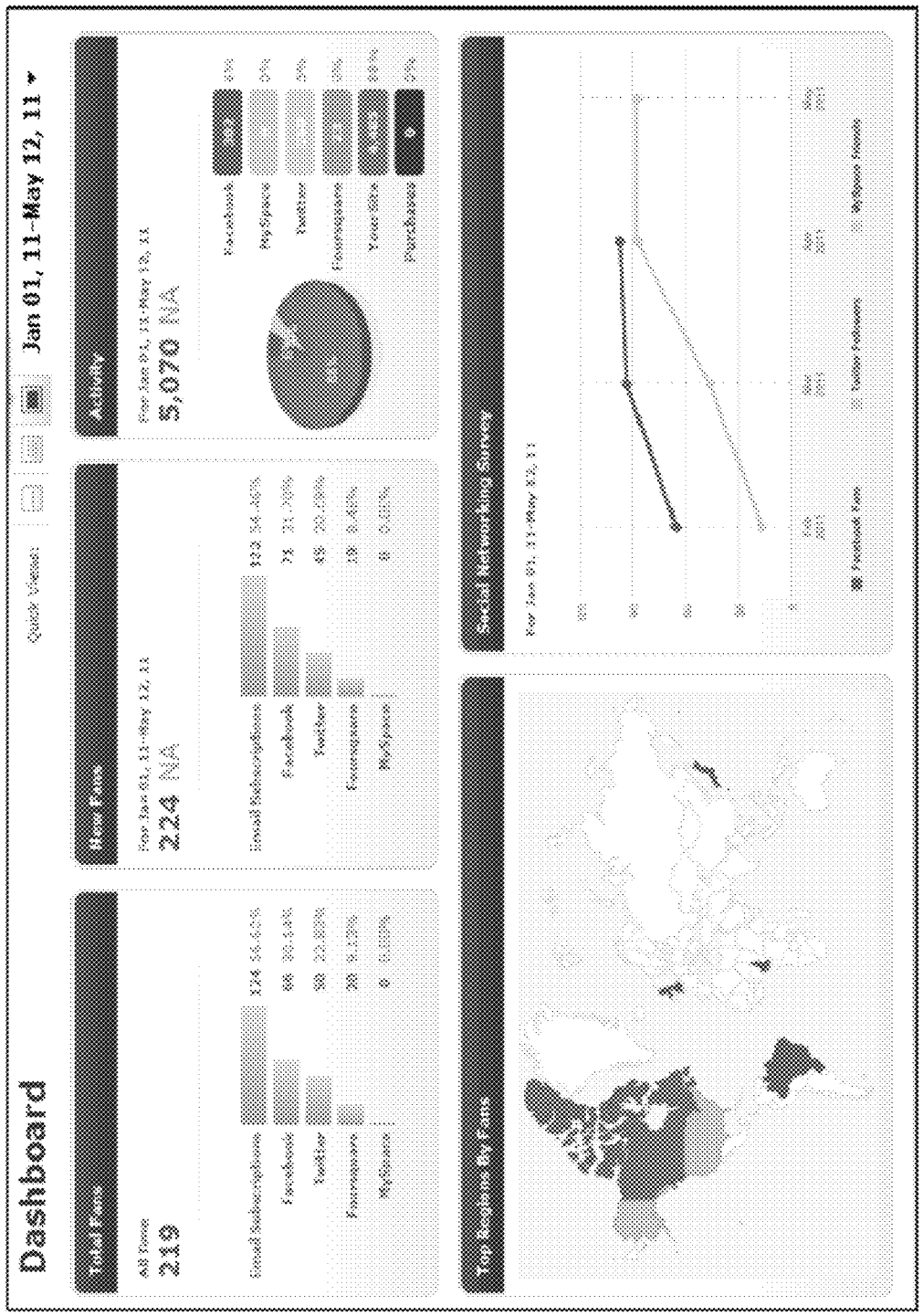
FIG. 17 is an exemplary interface display configured to display a brand dashboard.
Figure 18:
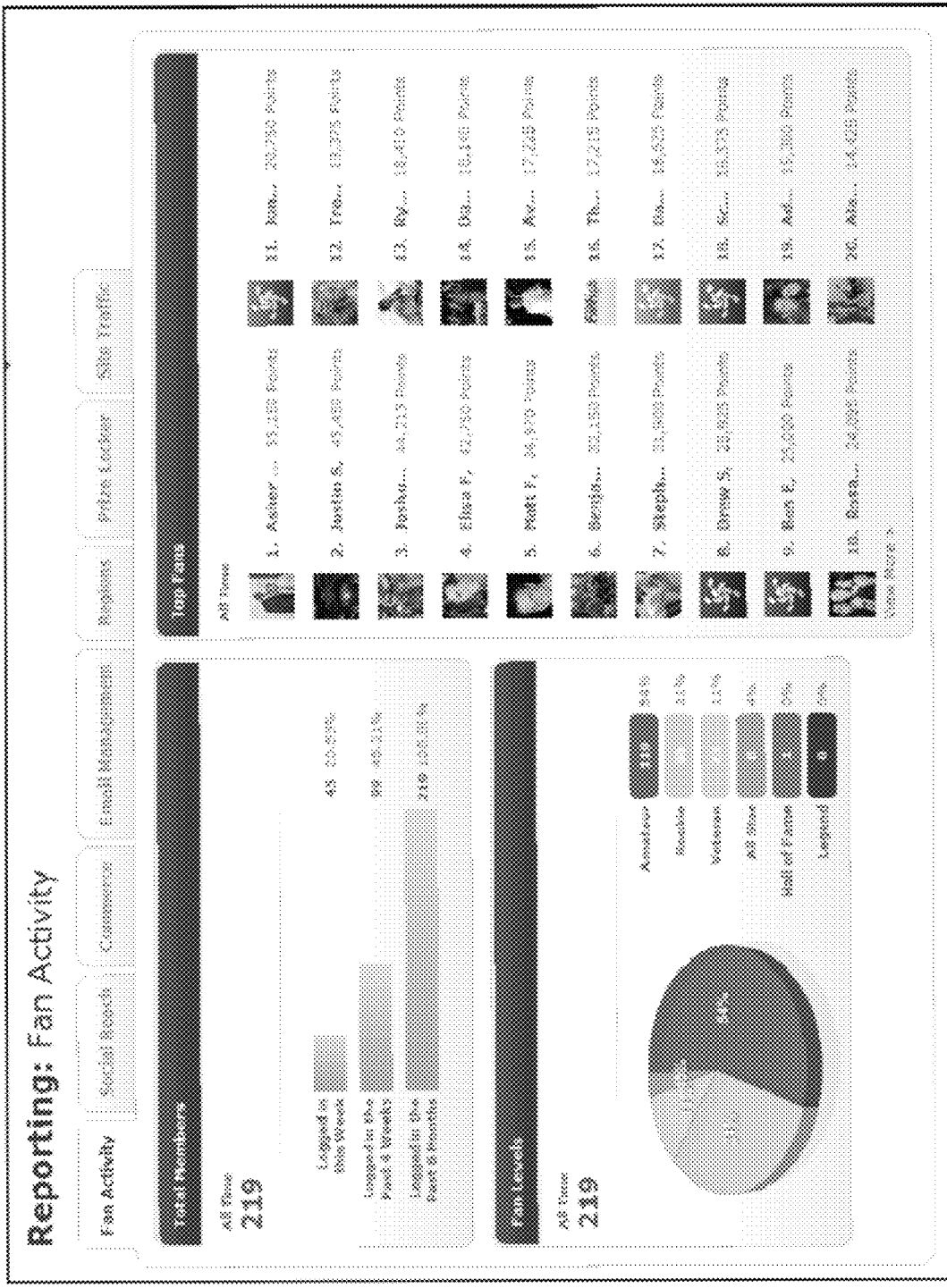
FIG. 18 is an exemplary interface display configured to display brand enthusiast activity.
Figure 19:
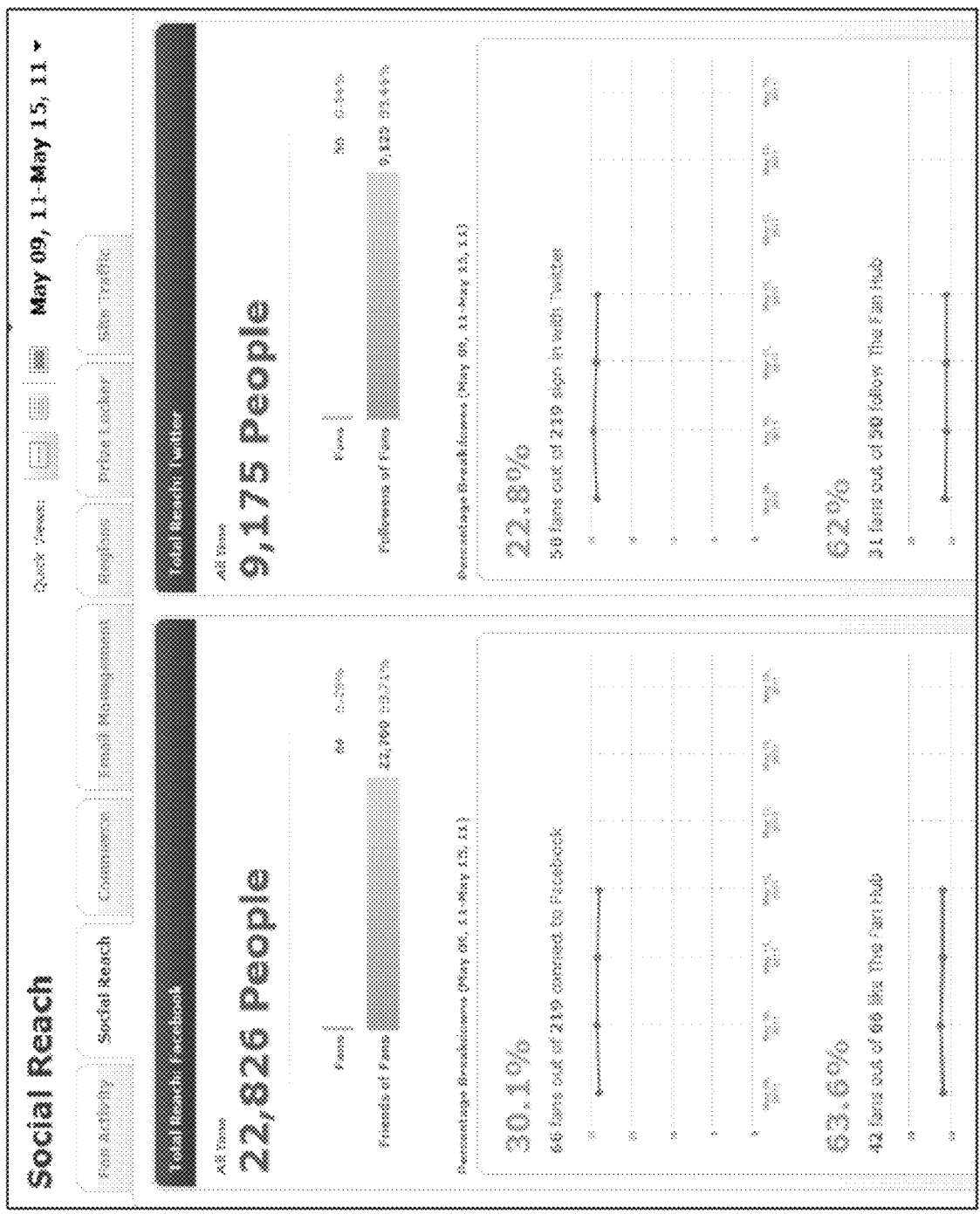
FIG. 19 is an exemplary interface display configured to display social reach information.
Figure 20:
FIG. 20 is another exemplary interface display configured to display social reach information.
Figure 21:
FIG. 21 is an exemplary interface display configured to display demographic information of a population of brand enthusiasts.
Figure 22:
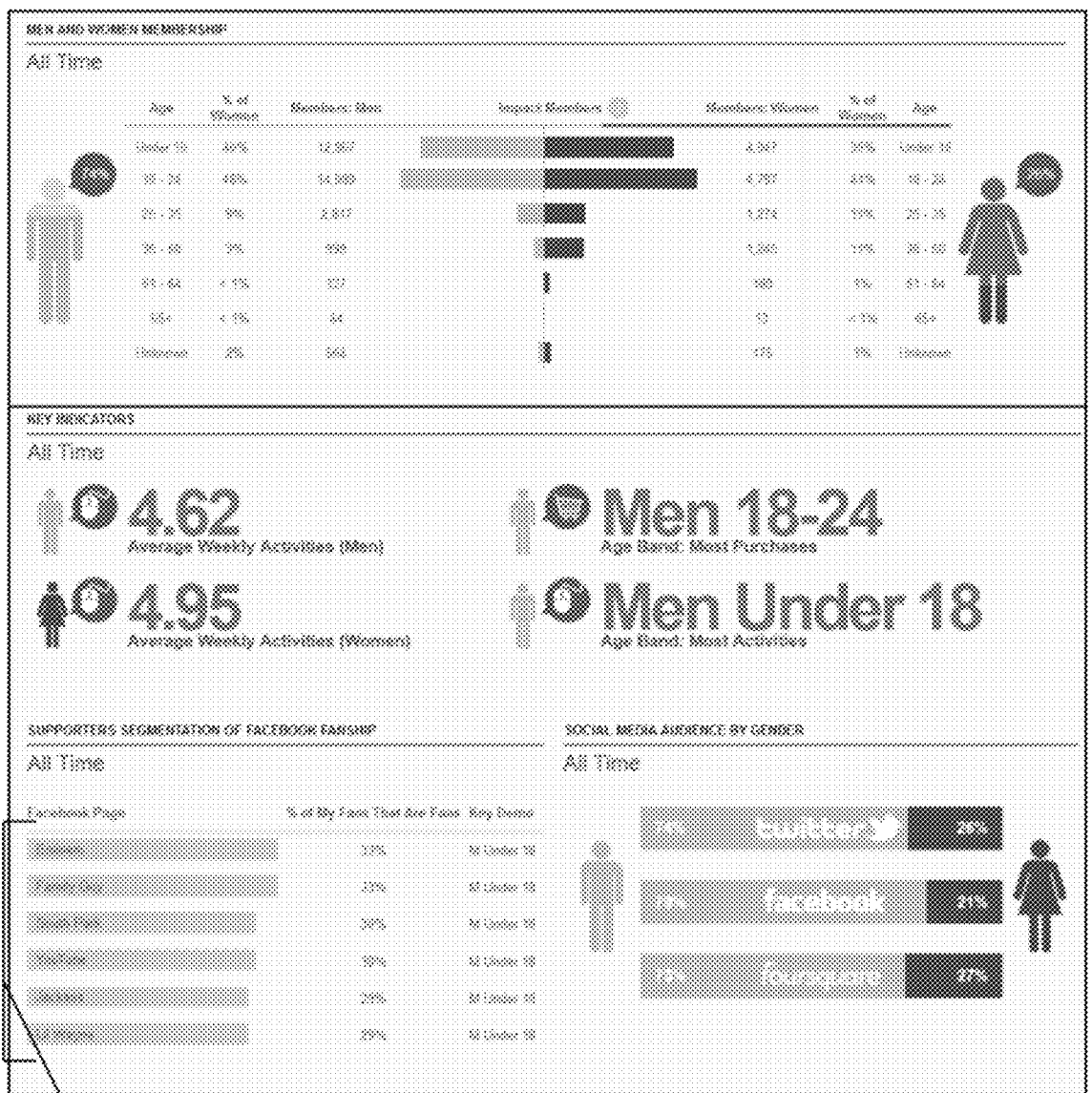
FIG. 22 is another exemplary interface display configured to display information descriptive of the demographics of a population of brand enthusiasts.
Figure 23:
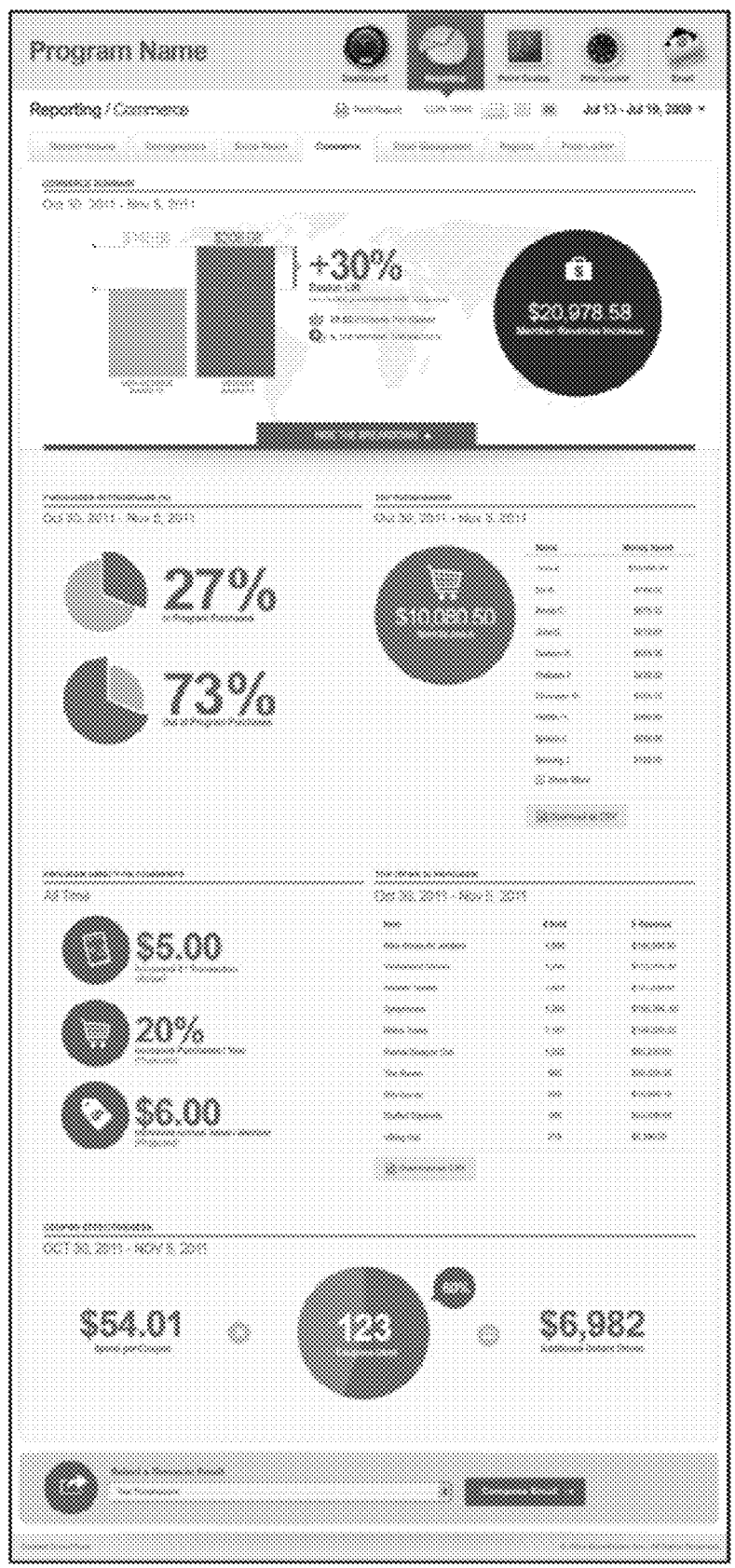
FIG. 23 is an exemplary interface display configured to display information descriptive of the financial results of a brand loyalty program.
Figure 24:
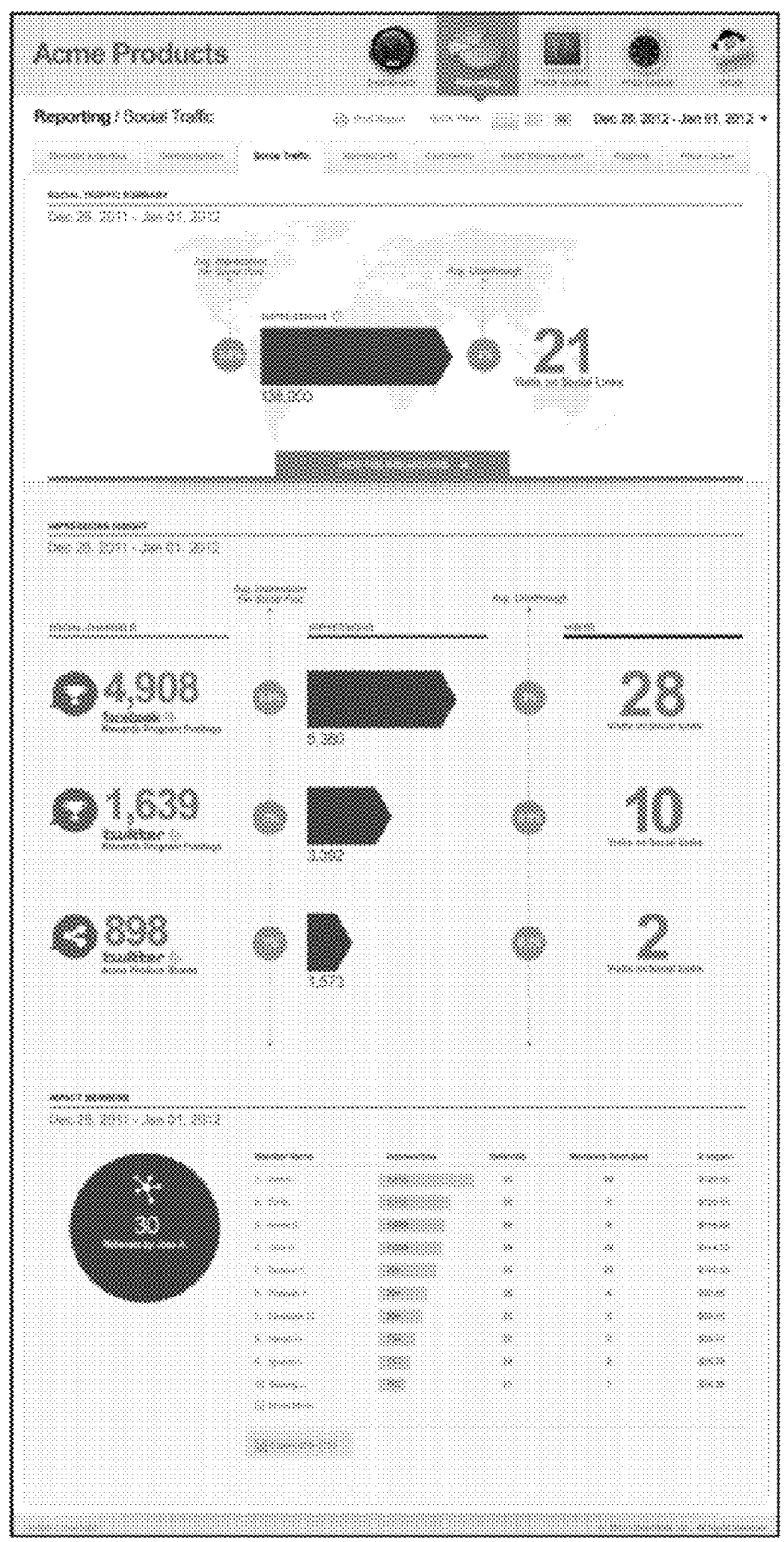
FIG. 24 is an exemplary interface display configured to display information descriptive of social traffic associated with a brand loyalty program.
Figure 25:
FIG. 25 is an exemplary interface display configured to display information descriptive of brand enthusiast interactions within a brand loyalty program.
Figure 26:
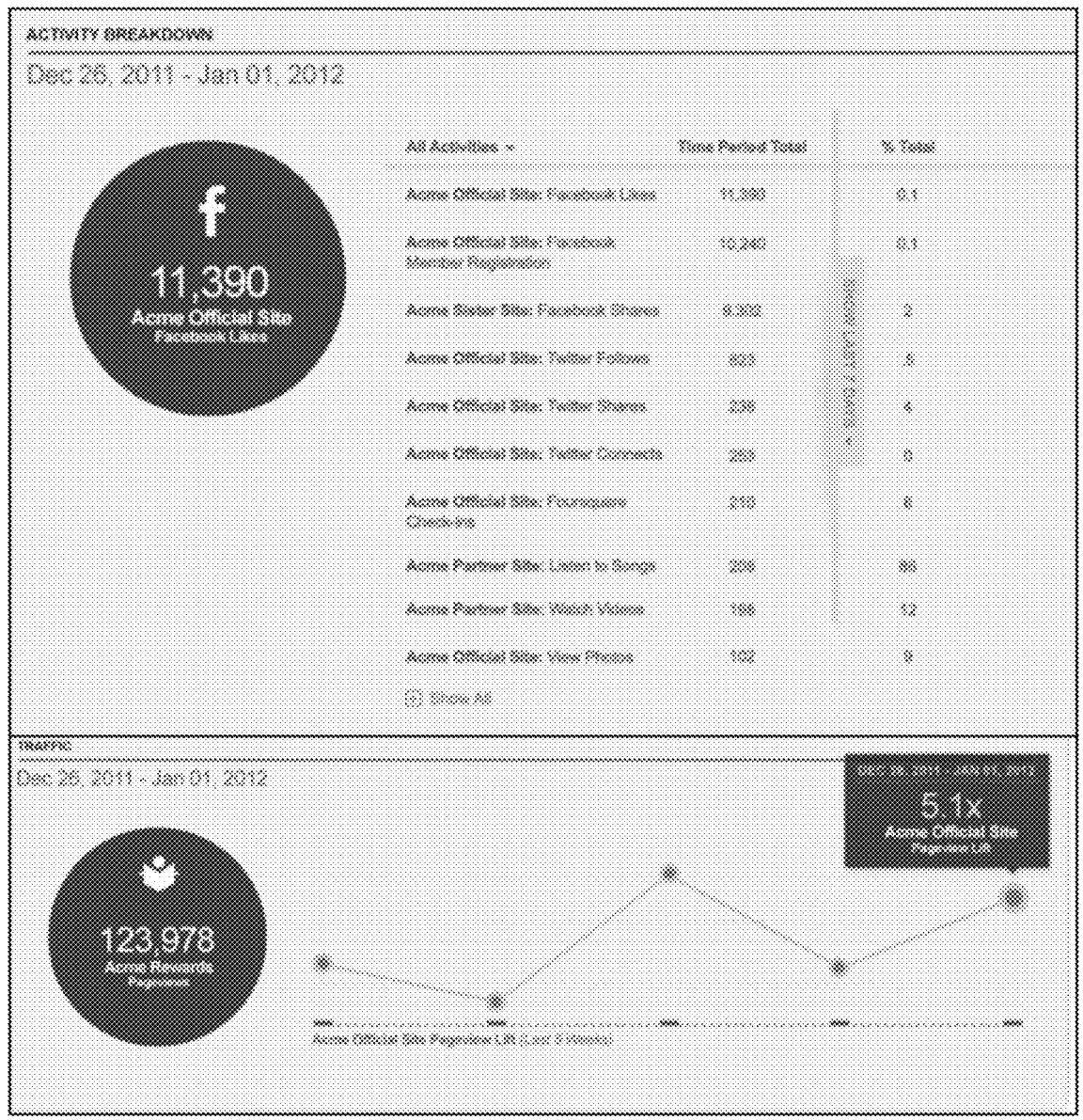
FIG. 26 is another exemplary interface display configured to display information descriptive of brand enthusiast interactions within a brand loyalty program.

In other embodiments, the manager interface 204 exchanges email campaign configuration information and reports with a brand manager via a set of user interface screens. FIG. 15 illustrates one such screen, the screen 1500. The screen 1500 includes a tab control 1502 through which the manager interface 204 receives a campaign name, recipients, email message and sending schedule. As shown in FIG. 15, the screen 1500 can filter recipients by country, state or city and by brand enthusiast level. These features enable the manager interface 204 to build well targeted and highly effective email campaigns. The FIG. 16 illustrates an email campaign reporting screen that provides a variety of metrics including the number of emails delivered by a campaign and the percentage of delivered emails that were opened.

In some embodiments, the manager interface 204 provides summary reporting of metrics and other information to brand managers via a set of user interface screens. FIGS. 17-26 depict embodiments of several reporting screens generated by the manager interface 204. As shown in FIGS. 17-20, the manager interface 204 provides metrics such as brand enthusiasts by source system, new brand enthusiasts by source system, activity by source system, brand enthusiasts by brand enthusiast level, the social reach of brand enthusiasts (e.g., the number of users associated with the user on social media source systems, such as FACEBOOK and TWITTER) and influential brand enthusiasts by source system. As shown in FIGS. 21-26, the manager interface 204 provides metrics that summarize brand enthusiast activity categorized by demographic characteristics, metrics that summarize the commercial impact of brand loyalty programs managed by the loyalty management system, metrics that summarize activity conducted by brand enthusiasts on various source systems, and metrics that summarize activity conducted by brand enthusiasts combined over all source systems. As shown in FIGS. 27-28, the manager interface 204 provides metrics that forecast the overall financial impact of rewards administered by the loyalty management system.

The screens illustrated by FIGS. 17-28 may be used by brand managers to increase the relevance of their communications to brand enthusiasts. For example, according to one embodiment illustrated by FIG. 22, a screen 2200 includes a table 2202. The table 2202 displays information that identifies a percentage of the brand enthusiasts who are also enthusiastic about another brand. This information may be used by brand managers to identify cross branding opportunities in which communications may offer goods or services associated with both brands, thereby increasing the relevance of the offers and the likelihood that they will result in purchases.

Multi-Channel Loyalty Management Processes

Figure 29:
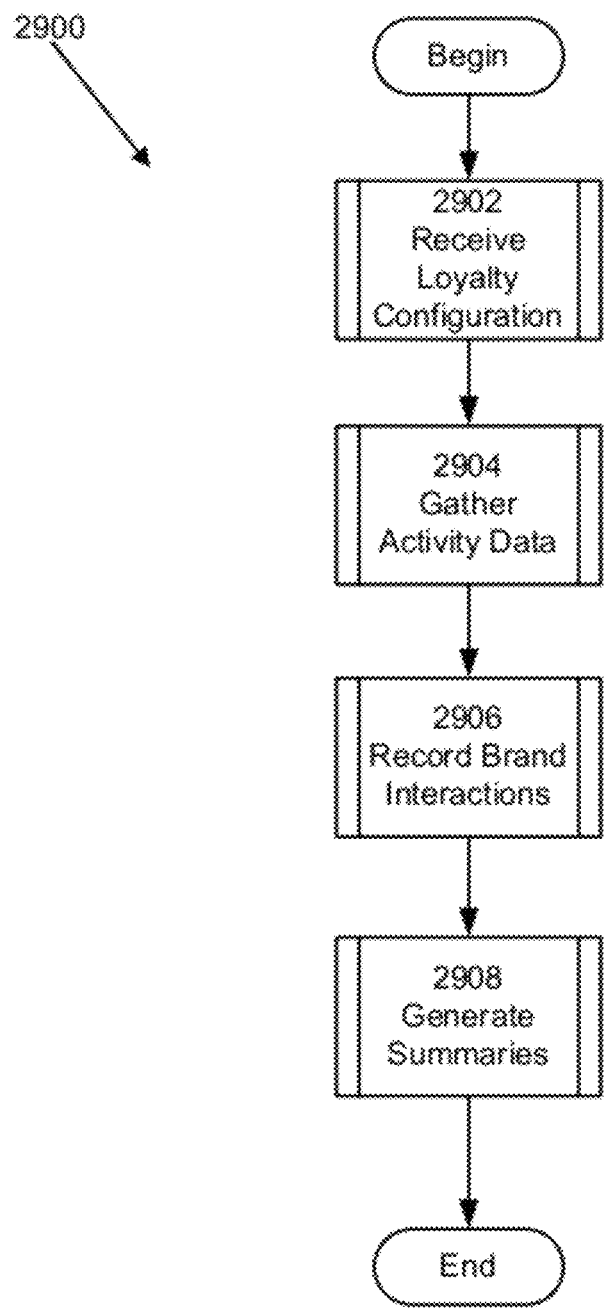
FIG. 29 is a flow diagram depicting a process of managing brand loyalty.

As described above with reference to FIG. 1, several embodiments perform processes that manage brand loyalty programs. In some embodiments, these loyalty management processes are executed by a loyalty management system, such as the loyalty management system 100 described above with reference to FIG. 1. One example of such a loyalty management process is illustrated in FIG. 29. According to this example, the loyalty management process 2900 includes acts of receiving configuration information for a brand loyalty program, gathering brand enthusiast activity data, recording brand interactions indicated within the activity data, and generating summaries based on the recorded brand interactions.

In act 2902, the loyalty management system receives brand loyalty program configuration information from an external entity, such as the brand manager 116 described above with reference to FIG. 1. Exemplary processes performed within the act 2902 are described further below with reference to FIG. 30.

In act 2904, the loyalty management system gathers information descriptive of brand enthusiast activity from one or more external entities, such as the brand website 102, the third-party website 104, the message system 106, the mobile device application 108, and the point of sale system 110 described above with reference to FIG. 1. Exemplary processes performed within the act 2904 are described further below with reference to FIG. 31.

In act 2906, the loyalty management system records information descriptive of any brand interactions indicated within the activity information gathered in the act 2904. Exemplary processes performed within the act 2906 are described further below with reference to FIG. 32.

In act 2908, the loyalty management system generates summaries descriptive of brand interactions stored within a loyalty data store, such as the loyalty data store 224 describe above with reference to FIG. 2. Exemplary processes performed within the act 2908 are described further below with reference to FIG. 33. After completion of the act 2908, the loyalty management system terminates the loyalty management process 2900.

Processes in accord with the loyalty management process 2900 track and manage brand enthusiast activities across one or more websites and other source systems, thereby providing a complete picture of brand enthusiast interaction with a brand.

Figure 30:
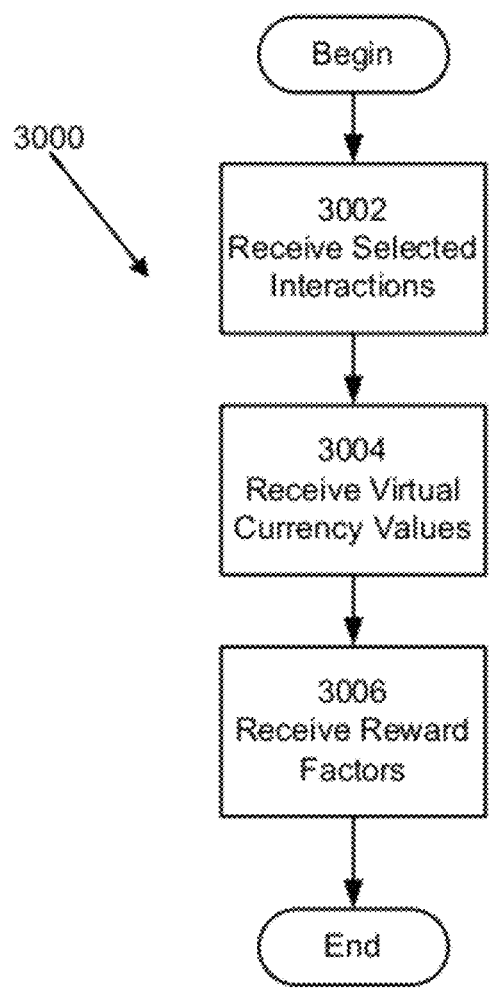
FIG. 30 is a flow diagram depicting a process of receiving brand loyalty program configuration information.

As described above with reference to the act 2902, some embodiments perform processes through which a loyalty management system receives brand loyalty program configuration information. In several embodiments, these loyalty configuration processes are executed by a manager interface component, such as the manager interface component 204 described with reference to FIG. 2. One example of such a loyalty configuration process is illustrated in FIG. 30. According to this example, the brand loyalty program configuration process 3000 includes acts of receiving information specifying brand interaction selections, receiving information specifying virtual currency values associated with the selected brand interactions, and receiving information specifying reward factors.

In act 3002, the manager interface receives information descriptive of particular brand interactions selected for inclusion in a brand loyalty program. In some embodiments, the manager interface receives this information via one or more user interface screens that include a variety of elements arranged to exchange selections of particular brand interactions. Exemplary brand interactions that may be selected for inclusion in a brand loyalty program include following the brand website on TWITTER, visiting specific pages within the brand website, joining an email list associated with the brand, synchronizing an account on FACEBOOK with an account on the loyalty management system by providing the loyalty management system with logon credentials associated with the FACEBOOK account, reading an article associated with the brand, reading email provided via the loyalty management system, synchronizing an account on TWITTER with an account on the loyalty management system by providing the loyalty management system with logon credentials associated with the TWITTER account, becoming a "fan" of the brand website on FACEBOOK, providing additional profile data to the loyalty management system, inviting other brand enthusiasts to join the loyalty management system by creating an account thereon, providing a birthday of a brand enthusiast to the loyalty management website, mentioning the brand website on TWITTER, retweeting news associated with the brand on TWITTER, providing a phone number associated with a brand enthusiast to the loyalty management system, sharing information regarding the brand on TWITTER, synchronizing an account on FOURSQUARE with an account on the loyalty management system by providing the loyalty management system with logon credentials associated with the FOURSQUARE account, "checking-in" to an event associated with the brand using FOURSQUARE, "comment" on a FACEBOOK page associated with the brand, purchasing goods or services associated with the brand, and "liking" the status of the brand website on FACEBOOK.

In act 3004, the manager interface receives information descriptive of values of virtual currency to associate with each of the selected brand interactions and stores associations between the values and the selected brand interactions in the loyalty data store. Next, in act 3006, the manager interface receives information descriptive of reward factors to reference when calculating virtual currency amounts used to reward brand enthusiasts. In at least one embodiment, the manager interface presents a ranking screen, such as the screen 1400 described above with reference to FIG. 14, and receives the reward factor information via the ranking screen. Responsive to receiving the reward factor information and as part of the act 3006, the manager interface stores the reward factor information in the loyalty data store. Next, the manager interface terminates the loyalty configuration process 3000.

Processes in accord with the loyalty configuration process 3000 enable setup and maintenance of brand loyalty programs with an incentive structure that may be varied over time, thereby providing brand managers with the ability to adjust brand loyalty programs to meet the evolving needs of the brand.

Figure 31:
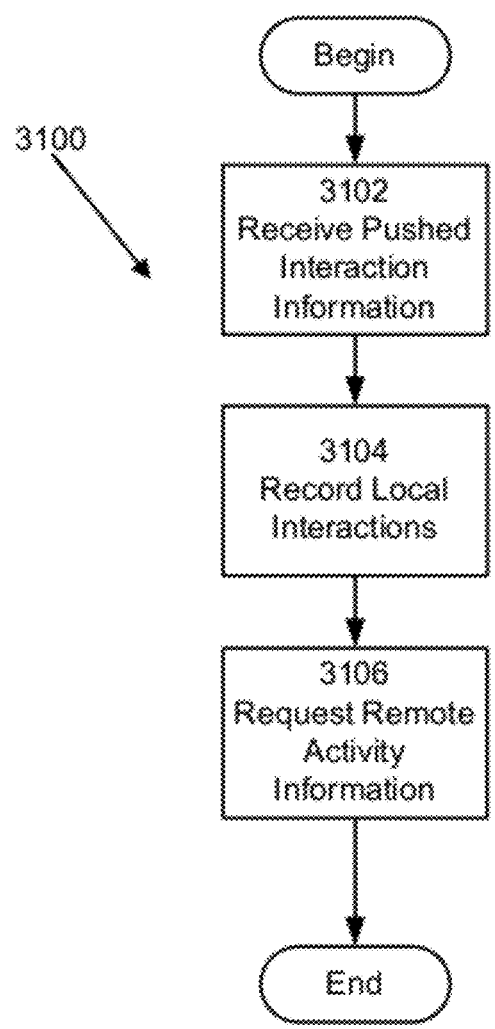
FIG. 31 is a flow diagram depicting a process of gathering activity information related to a brand loyalty program.

As described above with reference to the act 2904, some embodiments perform processes through which a loyalty management system gathers information descriptive of activities conducted by brand enthusiasts. In several embodiments, these activity gathering processes are executed by a variety of interface components, such as the brand enthusiast interface 202, the tag interface 206, the third-party interface 208, and the API 212 described with reference to FIG. 2. One example of such an activity gathering process is illustrated in FIG. 31. According to this example, the activity data gathering process 3100 includes acts of receiving pushed brand interaction information, receiving local interactions, and requesting remote activity information from one or more source systems.

In act 3102, the API receives batches of brand interaction information from one or more source systems, such as the point of sale system or the mobile device application, and stores the brand interaction information in the loyalty data store. Also in the act 3102, the tag interface receives brand interaction information from one or more source systems, such as the brand website, and stores the brand interaction information in the loyalty data store.

In act 3104, the brand enthusiast interface receives brand interaction information via one or more user interface screens and stores the brand interaction information in the loyalty data store. For instance, in one embodiment, the brand enthusiast interface provides a user interface screen, such as the screen depicted in FIG. 5, that includes an actionable area 500. According to this embodiment, responsive to receiving an indication that a brand enthusiast has actuated the actionable area 500, the brand enthusiast interface provides a screen that enables the brand enthusiast to invite others to join the loyalty management system by creating an account therein. Responsive to the brand enthusiast issuing an invitation through this screen, the brand enthusiast interface stores information specifying that the brand enthusiast conducted the brand interaction (i.e., issued the invitation) in the loyalty data store.

In act 3106, the third-party interface requests activity information for brand enthusiasts and stores activity information returned by source systems in response to this request in the loyalty data store. In some embodiments, the third-party interface requests and receives activity information that includes only brand interaction information. In other embodiments, the third-party interface requests activity information that includes brand interaction information and information descriptive of other activities. Next, the loyalty management system terminates the activity gathering process 3100.

Processes in accord with the activity gathering process 3100 enable collection of brand interaction and activity information from a wide variety of source systems, thereby consolidating the data needed to generate a complete picture of brand enthusiast interactions with a brand.

Figure 32:
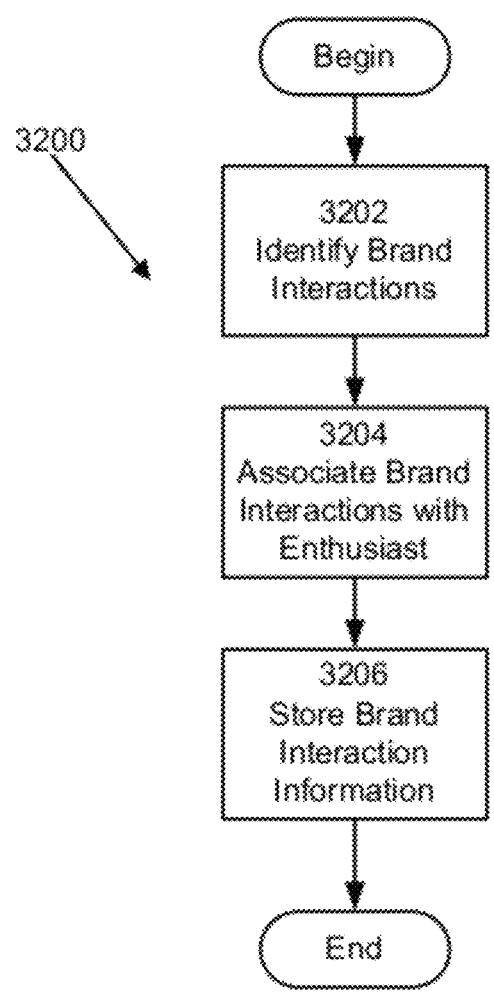
FIG. 32 is a flow diagram depicting a process of recording brand interactions associated with a brand loyalty program.

As described above with reference to the act 2906, some embodiments perform processes through which a loyalty management system records information descriptive of brand interactions conducted by brand enthusiasts. In several embodiments, these interaction recording processes are executed by an analytics engine component, such as the analytics engine 220 described with reference to FIG. 2. One example of such an interaction recording process is illustrated in FIG. 32. According to this example, the interaction recording process 3200 includes acts of identifying brand interactions, associating brand interactions with brand enthusiasts, and storing brand interaction information in the loyalty data store.

In act 3202, the analytics engine identifies brand interactions indicated within the activity information received in the act 3106. For instance, according to one embodiment, the analytics engine scans the activity information for predetermined identifiers of brand interaction information. In another embodiment, the analytics engine utilizes an index to identify brand interaction information.

In act 3204, the analytics engine groups the brand interaction information by brand enthusiast and associates the brand interaction information included in each group and the brand enthusiast identified in the group. In act 3206, the analytics engine stores the brand interaction information, including the associations between the brand enthusiasts and the brand interaction information, in the loyalty data store. Next, the loyalty management system terminates the interaction recording process 3200.

Processes in accord with the interaction recording process 3200 distill brand interaction information for further processing by the loyalty management system.

Figure 33:
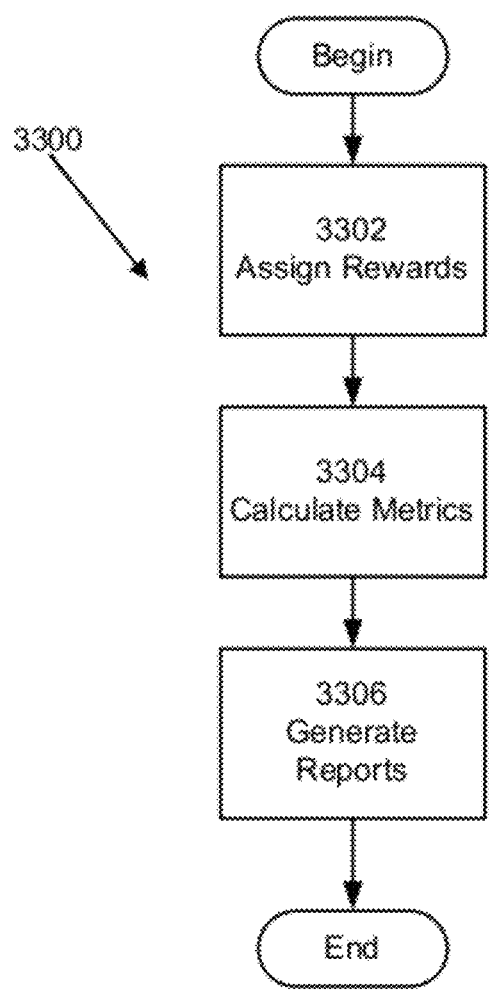
FIG. 33 is a flow diagram depicting a process of generating summary information based on data descriptive of brand interactions.

As described above with reference to the act 2908, some embodiments perform processes through which a loyalty management system generates summaries descriptive of brand interactions stored within the loyalty data store. In several embodiments, these summary generation processes are executed by the analytics engine component and a reward engine component, such as the rewards engine 222 described above with reference to FIG. 2. One example of such a summary generation process is illustrated in FIG. 33. According to this example, the interaction recording process 3300 includes acts of assigning reward amounts, calculating metrics, and generating reports.

In act 3302, the rewards engine assigns amounts of virtual currency to each unrewarded brand interaction stored in the loyalty data store. As described above, in some embodiments, the analytics engine calculates the amount of virtual currency to associate with a brand interaction by determining a value of virtual currency associated with the brand interaction and adjusting the value using a reward factor.

In act 3304, the analytics engine calculates a plurality of metrics that summarize the brand interaction information stored in the loyalty data store and stores the metrics in the loyalty data store. The metrics calculated by the analytics engine may include any of the metrics disclosed above with reference to FIG. 2.

In act 3306, the analytics engine generates reports based on the summary metrics calculated in the act 3304 and other information included in the loyalty data store. The reports generated by the analytics engine may include any of the report disclosed herein, including those illustrated by FIGS. 17-28.

Processes 2900-3300 each depict one particular sequence of acts in a particular embodiment. The acts included in these processes may be performed by, or using, one or more computer systems or automatic control devices specially configured as discussed herein. Some acts are optional and, as such, may be omitted in accord with one or more embodiments. Additionally, the order of acts can be altered, or other acts can be added, without departing from the scope of the systems and methods discussed herein. Furthermore, as discussed above, in at least one embodiment, the acts are performed on particular, specially configured machines, namely a loyalty management system configured according to the examples and embodiments disclosed herein.

Having thus described several aspects of at least one embodiment, it is to be appreciated that various alterations, modifications, and improvements may be made without departing from the scope of the embodiments disclosed herein. For instance, embodiments disclosed herein may also be used in other contexts. In addition, while some of the embodiments disclosed herein implement one brand loyalty program using a loyalty management system, other embodiments may implement a plurality of brand loyalty programs for each of a plurality of brands using a single loyalty management system. Such alterations, modifications, and improvements are intended to be part of this disclosure, and are intended to be within the scope of the embodiments discussed herein. Accordingly, the foregoing description and drawings are by way of example only.

What is claimed is:
1. A method for tracking brand interactions using a computer system, the method comprising:
receiving, by the computer system, information defining a loyalty program including a plurality of predefined brand interactions, the information associating each respective predefined brand interaction of the plurality of predefined brand interactions with a corresponding process executed by at least one discrete source system different from the computer system, the plurality of predefined brand interactions including at least one social media interaction and at least one purchase interaction;
receiving, by the computer system, a first indication of a first interaction defined within the plurality of predefined brand interactions from a first source system, the first indication associating a brand enthusiast with the first interaction;
receiving, by the computer system, a second indication of a second interaction defined within the plurality of predefined brand interactions from a second source system different from the first source system, the second indication associating the brand enthusiast with the second interaction; and recording, by the computer system, an association between the brand, the first interaction, the second interaction and the brand enthusiast.

2. The method according to claim 1, wherein receiving the first indication includes receiving the first indication from at least one of FACEBOOK, TWITTER, MYSPACE, FOURSQUARE, GMAIL, YAHOO! Mail, HOTMAIL, and AOL Mail.

3. The method according to claim 1, further comprising:
recording a first reward in response to receiving the first indication; and
recording a second reward in response to receiving the second indication.

4. The method according to claim 3, wherein recording the first reward includes:
determining a reward factor;
determining a first amount of virtual currency; and
calculating the first reward using the reward factor and the first amount of virtual currency.

5. The method according to claim 4, further comprising:
receiving a request to adjust the reward factor;
receiving a third indication of a third interaction defined within the plurality of predefined brand interactions from the first source system, the third indication associating the brand enthusiast with the third interaction; and
recording a third reward in response to receiving the third indication, wherein recording the third reward includes:
determining an adjusted reward factor;
determining a second amount of virtual currency; and
calculating the third reward using the adjusted reward factor and the second amount of virtual currency.

6. The method according to claim 1, further comprising determining a summary characterizing the first interaction and the second interaction.

7. The method according to claim 6, further comprising reporting the summary.

8. The method according to claim 7, wherein determining the summary includes determining an impact score for the brand enthusiast.

9. The method according to claim 7, wherein determining the summary includes determining a social influence score for the brand enthusiast.

10. A system for tracking brand interactions, the system comprising:
a memory;
at least one processor coupled to the memory and configured to:
receive information defining a loyalty program including a plurality of predefined brand interactions, the information including associations between each respective predefined brand interaction of the plurality of predefined brand interactions and a corresponding process executed by at least one discrete source system different from the computer system, the plurality of predefined brand interactions including at least one social media interaction and at least one purchase interaction;
receive a first indication of a first interaction defined within the plurality of predefined brand interactions from a first source system, the first indication including an identifier of a brand enthusiast associated with the first interaction;
receive a second indication of a second interaction defined within the plurality of predefined brand interactions from a second source system different from the first source system, the second indication including an identifier of the brand enthusiast; and
record an association between the brand, the first interaction, the second interaction and the brand enthusiast.

11. The system according to claim 10, wherein the at least one discrete source system includes at least one of FACEBOOK, TWITTER, MYSPACE, FOURSQUARE, GMAIL, YAHOO! Mail, HOTMAIL and AOL Mail.

12. The system according to claim 10, wherein the at least one processor is further configured to:
record a first reward in response to receiving the first indication; and
record a second reward in response to receiving the second indication.

13. The system according to claim 12, wherein the at least one processor is further configured to:
determine a reward factor;
determine a first amount of virtual currency; and
calculate the first reward using the reward factor and the first amount of virtual currency.

14. The system according to claim 13, wherein the at least one processor is further configured to:
receive a request to adjust the reward factor;
receive a third indication of a third interaction defined within the plurality of predefined brand interactions from the first source system, the third indication including an identifier of the brand enthusiast; and
record a third reward in response to receiving the third indication by being configured to:
determine an adjusted reward factor;
determine a second amount of virtual currency; and
calculate the third reward using the adjusted reward factor and the second amount of virtual currency.

15. The system according to claim 10, further comprising determining a summary characterizing the first interaction and the second interaction.

16. The system according to claim 15, wherein the at least one processor is further configured to report the summary.

17. The system according to claim 16, wherein the summary includes an impact score for the brand enthusiast.

18. The system according to claim 16, wherein the summary includes a social influence score for the brand enthusiast.

19. A non-transitory computer readable medium storing instructions for tracking brand interactions, the instructions encoded to instruct at least one processor to:
receive information defining a loyalty program including a plurality of predefined brand interactions, the information including associations between each respective predefined brand interaction of the plurality of brand predefined interactions and a corresponding process executed by at least one discrete source system different from the computer system, the plurality of predefined brand interactions including at least one social media interaction and at least one purchase interaction;
receive a first indication of a first interaction defined within the plurality of predefined brand interactions from a first source system, the first indication including an identifier of a brand enthusiast associated with the first interaction;
receive a second indication of a second interaction defined within the plurality of predefined brand interactions from a second source system different from the first source system, the second indication including an identifier of the brand enthusiast; and
record an association between the brand, the first interaction, the second interaction and the brand enthusiast.

20. The computer readable medium according to claim 19, wherein the instructions further instruct the at least one processor to receive the first indication from at least one of FACEBOOK, TWITTER, MYSPACE, FOURSQUARE, GMAIL, YAHOO! Mail, HOTMAIL, and AOL Mail.

* * * * *